United States Patent
Piracha et al.

(10) Patent No.: US 12,078,215 B2
(45) Date of Patent: Sep. 3, 2024

(54) METHOD FOR OPERATING A VEHICLE DRIVETRAIN

(71) Applicants: Ningbo Geely Automobile Research & Development Co., Ltd., Ningbo (CN); Zhejiang Geely Holding Group Co., Ltd., Zhejiang (CN)

(72) Inventors: Muddassar Piracha, Gothenburg (SE); Qianyin Kong, Stockholm (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 0 days.

(21) Appl. No.: 18/078,968

(22) Filed: Dec. 11, 2022

(65) Prior Publication Data

US 2023/0108291 A1    Apr. 6, 2023

Related U.S. Application Data

(63) Continuation of application No. PCT/CN2021/100407, filed on Jun. 16, 2021.

(30) Foreign Application Priority Data

Jul. 6, 2020   (EP) ................................... 20184312

(51) Int. Cl.
*F16D 48/06*     (2006.01)

(52) U.S. Cl.
CPC .... *F16D 48/06* (2013.01); *F16D 2500/10412* (2013.01); *F16D 2500/10462* (2013.01)

(58) Field of Classification Search
CPC .......... F16D 48/06; F16D 2500/10412; F16D 2500/10462; F16D 2500/30408
See application file for complete search history.

(56) References Cited

U.S. PATENT DOCUMENTS

| | | |
|---|---|---|
| 4,817,470 A | 4/1989 | Mueller |
| 6,393,828 B1 | 5/2002 | Zhao |
| 7,101,302 B2 | 9/2006 | Raghavan |

(Continued)

FOREIGN PATENT DOCUMENTS

| | | |
|---|---|---|
| CN | 102126425 A | 7/2011 |
| CN | 103373220 A | 10/2013 |

(Continued)

OTHER PUBLICATIONS

International Search Report from International Application No. PCT/CN2021/100407, mailed Sep. 24, 2021, 3 pages.

*Primary Examiner* — Huan Le
(74) *Attorney, Agent, or Firm* — Tucker Ellis LLP

(57) ABSTRACT

A method for operating a vehicle drivetrain having a dog clutch and an initial phase shift identifying mode and a normal operating mode. The method includes providing a dog clutch for selective torque transmission, wherein the dog clutch has a first clutch portion with a first set of teeth and a second clutch portion with a second set of teeth, and wherein the first clutch portion is axially moveable for enabling shifting of the dog clutch between an engaged state, in which the first and second clutch portions are operable to transmit torque between first and second clutch portion via the first and second set of teeth, and a disengaged state, in which the first and second clutch portions are rotatable with respect to each.

16 Claims, 9 Drawing Sheets

(56) References Cited

U.S. PATENT DOCUMENTS

| | | |
|---|---|---|
| 2009/0048747 A1 | 2/2009 | Stridsberg |
| 2010/0264861 A1 | 10/2010 | Basic |
| 2014/0221149 A1 | 8/2014 | Wilton |
| 2018/0054148 A1 | 2/2018 | Zhao |

FOREIGN PATENT DOCUMENTS

| | | |
|---|---|---|
| CN | 108016285 A | 5/2018 |
| DE | 19800158 A1 | 7/1998 |
| DE | 102011051859 A1 | 1/2013 |
| EP | 2821673 A1 | 1/2015 |
| EP | 3521649 A1 | 8/2019 |
| IN | 109334428 A | 2/2019 |
| WO | 2008019848 A2 | 2/2008 |
| WO | 2020046974 A1 | 3/2020 |

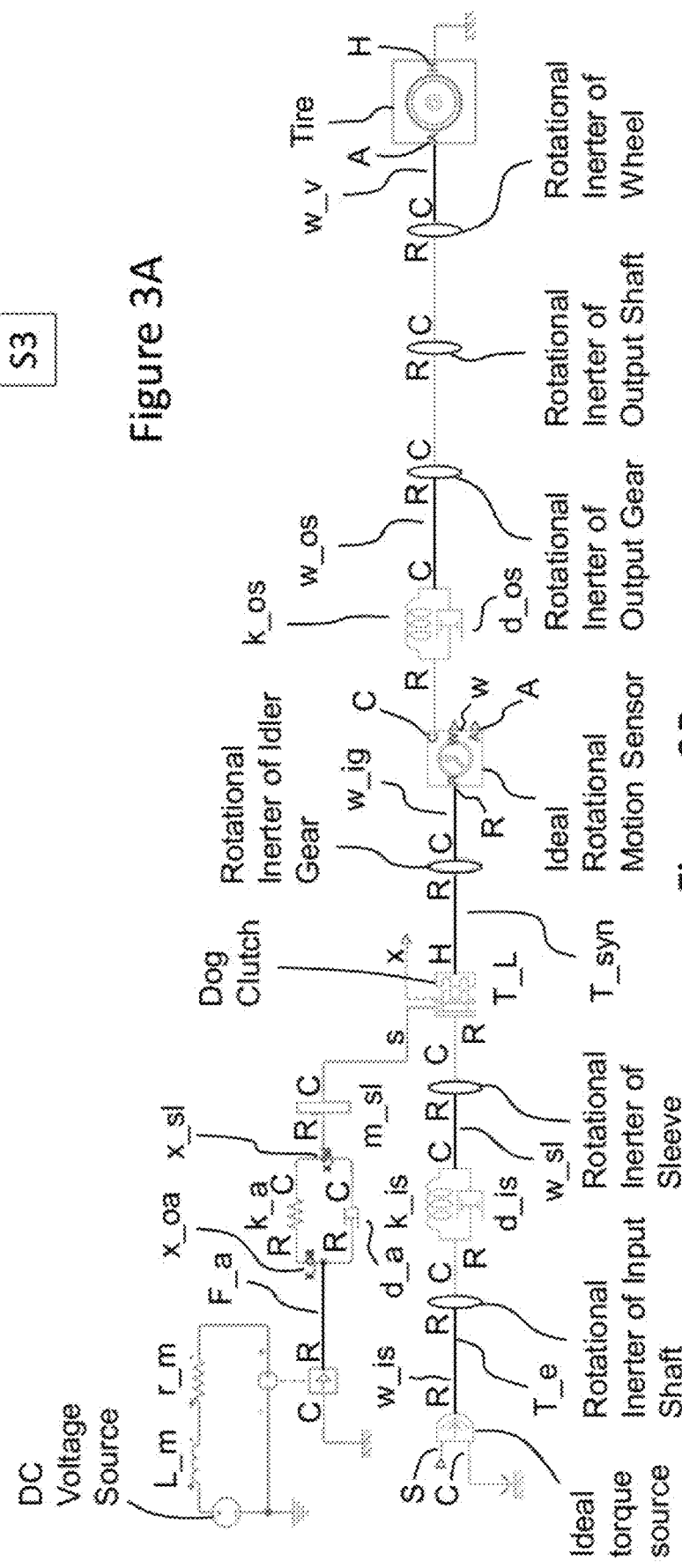
Figure 3A
Figure 3B

METHOD FOR OPERATING A VEHICLE DRIVETRAIN

RELATED APPLICATION DATA

This application is a continuation of International Patent Application No. PCT/CN2021/100407, filed Jun. 16, 2021, which claims the benefit of European Patent Application No. 20184312.5, filed Jul. 6, 2020, the disclosures of which are incorporated herein by reference in their entireties.

TECHNICAL FIELD

The present disclosure relates to a method for operating a vehicle drivetrain, as well as a corresponding drivetrain.

The method and drivetrain according to the disclosure can be implemented or arranged in any type of vehicle having a dog clutch, such as a car. Moreover, even if the method and drivetrain according to the disclosure will be described primarily in relation to a car, the method and drivetrain is not restricted to this particular vehicle, but may as well be installed or implemented in another type of vehicle, such as a truck, a bus, a rail vehicle, a marine vessel, a working vehicle, a motorcycle or the like.

BACKGROUND

In the field of transmission gear shifting and dog clutch engagement process there is a desire to reduce mechanical noise, wear and even failure during gear engagement or dog clutch engagement.

It is known to use synchronizers during gear shifting in vehicle transmissions. Synchronizers include a friction surface that mates with a corresponding friction surface of the gear for synchronising the rotational speed of the synchroniser and gear before gear engagement, thereby reducing noise during gear shifting. However, synchronisers need high manufacturing precision to ensure precise motion, which leads to a high cost. With respect to the use of dog clutches, these are generally less complex than synchronisers, but efforts for providing improved gear engagement of dog clutches using specific teeth geometry of the dog clutch teeth generally results a complex and costly manufacturing of the dog clutch.

Consequently, there is a demand for a cost-efficient and easily implemented method for operating a transmission of a vehicle drivetrain including a dog clutch, as well as a drivetrain as such, that results in reduced mechanical noise and wear during gear engagement or dog clutch engagement.

SUMMARY

An object of the present disclosure is to provide a method for operating a vehicle drivetrain, and corresponding drivetrain, where the previously mentioned problems are avoided. This object is at least partly achieved by the features of the independent claims.

According to a first aspect of the present disclosure, there is provided a method for operating a vehicle drivetrain including a dog clutch and having at least two distinct operating modes: an initial phase shift identifying mode and a normal operating mode. The method comprises a first step of providing a dog clutch for selective torque transmission, wherein the dog clutch has a first clutch portion with a first set of teeth and a second clutch portion with a second set of teeth, and wherein the first clutch portion is axially moveable for enabling shifting of the dog clutch between an engaged state, in which the first and second clutch portions are operable to transmit torque between first and second clutch portion via the first and second set of teeth, and a disengaged state, in which the first and second clutch portions are rotatable with respect to each; a first electrical propulsion motor drivingly connected with one of the first and second clutch portions; and clutch actuator operably connected with the first clutch portion for shifting the dog clutch between the engaged and disengaged states by controlling an axial position of the first clutch portion.

The method further comprises a second step of setting the drive train in the initial phase shift identifying mode, which includes controlling the clutch actuator and the first electrical propulsion motor for performing a plurality of clutch engagement movements for a set of different relative angles between the first and second clutch portions, while registering for each individual clutch engagement movement a clutch actuator feedback signal associated with the clutch actuator and indicative of either successful mutual intermeshing engagement of the first and second sets of teeth, or teeth collision of the first and second sets of teeth; and identifying, based on the registered clutch actuator feedback signal, the initial phase shift between the first and second clutch portions that corresponds to successful mutual intermeshing engagement of the first and second sets of teeth.

Finally, the method comprises a third step of setting the drivetrain in a normal operating mode, which includes: obtaining angular position data associated with the first and second clutch portions; controlling engagement of the dog clutch while taking the obtained angular position data of first and second clutch portions and said identified initial phase shift into account for enabling interference-free engagement of the of the dog clutch.

Moreover, according to a second aspect of the present disclosure, there is provided a vehicle drive train comprising a dog clutch for selective torque transmission, wherein the dog clutch has a first clutch portion with a first set of teeth and a second clutch portion with a second set of teeth, and wherein the first clutch portion is axially moveable for enabling shifting of the dog clutch between an engaged state, in which the first and second clutch portions are operable to transmit torque between first and second clutch portion via the first and second set of teeth, and a disengaged state, in which the first and second clutch portions are rotatable with respect to each; a first electrical propulsion motor drivingly connected with one of the first and second clutch portions; a clutch actuator operably connected with the first clutch portion for shifting the dog clutch between the engaged and disengaged states by controlling an axial position of the first clutch portion; and an electronic control system configured for controlling the operation of the drivetrain in at least two distinct operating modes: an initial phase shift identifying mode and a normal operating mode.

Specifically, the electronic control system is configured for setting the drivetrain in the initial phase shift identifying mode, which includes the steps of: controlling the clutch actuator and the first electrical propulsion motor for performing a plurality of clutch engagement movements for a set of different relative angles between the first and second clutch portions, while registering for each individual clutch engagement movement a clutch actuator feedback signal associated with the clutch actuator and indicative of either successful mutual intermeshing engagement of the first and second sets of teeth, or teeth collision of the first and second sets of teeth, and identifying, based on the registered clutch actuator feedback signal, the initial phase shift between the first and second clutch portions that corresponds to successful mutual intermeshing engagement of the first and second sets of teeth; and subsequently setting the drivetrain in a normal operating mode, which includes the steps of: obtaining angular position data associated with the first and second clutch portions, controlling engagement of the dog clutch while taking the obtained angular position data of first and second clutch portions, and said identified initial phase shift into account for enabling interference-free engagement of the of the dog clutch.

In this way, it becomes possible to replace costly synchronisers with relatively cost-efficient and robust dog clutches for gear engagement in stepped gear transmissions without having increased noise and wear, and engagement and use of dog clutches in the vehicle drivetrain it also improved in terms of reduced noise and wear.

Specifically, by using for example a model-based control of the process during gear shifting and dog clutch engagement, and with knowledge of at least the rotational position of the first and second clutch portions of the dog clutch before engagement, the clutch or shift sleeve actuator may be controlled to perform the required axial shift motion of the clutch portion or shift sleeve at a time point that results in practically interference-free engagement of the dog teeth of the dog clutch, i.e. without teeth collision.

In addition, since the dog teeth do not need to be designed for enabling guidance or simplified engagement in case of engagement in non-matching angular position of the dog clutch, such as for example by having conical or pointed front tooth, the design of the dog teeth may be simplified, having for example a more blunt front portion, thereby enabling more cost-efficient manufacturing of the dog teeth.

However, since the angular assembly position of each clutch portion of the dog clutch is generally not synchronised with the angular assembly position of an angular or speed sensor associated with the each clutch portion, or at least not accurately and reliably synchronised due to manufacture error, manufacturing tolerances, installation errors, etc. there may be a need for identifying the difference in angle, i.e. initial phase shift, between the first and second clutch portion that corresponds to an engagement position of the dog clutch.

Consequently, for implementing such model-based dog clutch control, the model requires knowledge of the relative angular position of the first and second clutch portions, as the provided by means of for example angular position sensors, angular speed sensors or derived from motor control of the electric motor, in which the teeth of the first and second clutch portions are in a mating position, i.e. in a position where the first and second clutch portions may be engaged with teeth interference.

This is accomplished by the method and drivetrain according to the disclosure by providing at least two distinct operating modes: an initial phase shift identifying mode and a normal operating mode, wherein the initial phase shift identifying mode includes execution of learning algorithm for automatic identification of the initial phase shift. Thereby, a method is self-compensating for manufacture error and installation error, etc.

Further advantages are achieved by implementing one or several of the features of the dependent claims.

In some example embodiments, the step of setting the drivetrain in the initial phase shift identifying mode is performed in connection with manufacturing of the vehicle, and/or in connection with vehicle maintenance. Since the initial phase shift typically depends on the assembly and manufacturing tolerances of each specific vehicle, a first calibration of the initial phase shift may be performed in connection with manufacturing of the vehicle for identifying a proper and unique individual initial phase shift for each vehicle. The initial phase shift is thereafter generally fixed over time and must thus not be recalibrated very often. However, a recalibration upon for example annual service or the like may be used for ensuring continuously updated and relevant initial phase shift for providing smooth and interference-free gear and clutch engagements.

In some example embodiments, the steps of controlling the clutch actuator and the first electrical propulsion motor for performing a plurality of clutch engagement movements for a set of different relative angles between the first and second clutch portions, while registering for each individual clutch engagement movement a clutch actuator feedback signal, and identifying the initial phase shift between the first and second clutch portions, are initiated manually or automatically by a remote service-provider or automatically by the vehicle internal control system and is performed with or without a driver or passenger within the vehicle. When setting the drivetrain in the initial phase shift identifying mode in connection with vehicle maintenance, the method for identifying and calibrating the initial phase shift may be performed fully automatic, without need for manual interaction by service technician or the like. Therefore, the calibration process may be initiated remotely, thereby providing improved user-friendliness.

In some example embodiments, the method comprises selecting the set of different relative angles between the first and second clutch portions to include a plurality, in particular at least 5, specifically at least 20, of individual relative angles. Too few different relative angles may cause the method to fail identifying a proper initial phase shift. However, too many different relative angles requires high computational effort for estimating the clutch control signals for all relative angles and large amount of iterations and thus long calibration operating time. The set of different relative angles between the first and second clutch portions may for example include about 10-100 individual relative angles.

In some example embodiments, the individual relative angles within the set of different relative angles are evenly distributed. Thereby, the likelihood for identifying a proper initial phase shift is increased.

In some example embodiments, the method comprises selecting the end points of the set of different relative angles between the first and second clutch portions sufficiently wide for ensuring including at least one clutch engagement position. Thereby, the likelihood for quickly identifying a proper initial phase shift is increased.

In some example embodiments, said steps of controlling the clutch actuator and the first electrical propulsion motor for performing a plurality of clutch engagement movements for a set of different relative angles between the first and second clutch portions, while registering for each individual clutch engagement movement the clutch actuator feedback signal, and identifying the initial phase shift between the first and second clutch portions that corresponds to successful mutual intermeshing engagement of the first and second sets of teeth, are part of applying a search algorithm, in particular a direct comparison search algorithm or a particle swarm optimization search algorithm or a binary search algorithm, or using an artificial neural network, for identifying said initial phase shift. The direct comparison search algorithm and the particle swarm optimization search algorithm are both deemed being suitable for identifying the initial phase shift.

In some example embodiments, said steps of controlling the clutch actuator and the first electrical propulsion motor for performing a plurality of clutch engagement movements for a set of different relative angles between the first and second clutch portions, while registering for each individual clutch engagement movement the clutch actuator feedback signal, and identifying the initial phase shift between the first and second clutch portions that corresponds to successful mutual intermeshing engagement of the first and second sets of teeth, involves selecting a set of initial phase options; controlling the clutch actuator for performing a dog clutch engagement attempt while registering the clutch actuator feedback signal and current angular position data of first and second clutch portions; calculating an estimated clutch actuator control signal for each individual initial phase option from the selected set of initial phase options for the obtained current angular position data of first and second clutch portions; comparing the estimated clutch actuator control signal for each individual initial phase option with the registered clutch actuator feedback signal for detecting a matching signal characteristic; removing any individual initial phase options, from the selected set of set of initial phase options, that do not result in a matching signal characteristic; and when only one individual initial phase option remain, the initial phase shift has been identified, otherwise, controlling the first electrical propulsion motor for setting the first and second clutch portions in a new relative angular position that is offset from the previous relative angular position, and repeating said steps of controlling the clutch actuator for performing a dog clutch engagement attempt while registering the clutch actuator feedback signal and current angular position data of first and second clutch portions, calculating the estimated clutch actuator control signal for each remaining individual initial phase option for the obtained current relative angular position, comparing the estimated clutch actuator control signal for each remaining individual initial phase option with the registered clutch actuator feedback signal for detecting a matching signal characteristic, and removing any individual initial phase options, from the selected set of set of initial phase options, that do not result in a matching signal characteristic. These method steps reflect the direct comparison search algorithm and provide a robust and easily implemented approach for identifying the initial phase shift.

In some example embodiments, wherein said steps of controlling the clutch actuator and the first electrical propulsion motor for performing a plurality of clutch engagement movements for a set of different relative angles between the first and second clutch portions, while registering for each individual clutch engagement movement the clutch actuator feedback signal, and identifying the initial phase shift between the first and second clutch portions that corresponds to successful mutual intermeshing engagement of the first and second sets of teeth, are art of a particle swarm optimization searching algorithm involving: performing a plurality of dog clutch engagement attempts, each at a different relative angular position of the first and second clutch portions, while registering, for each dog clutch engagement attempt, the clutch actuator feedback signal and current angular position data of first and second clutch portions; calculating an estimated clutch actuator control signal for each of the plurality of plurality of dog clutch engagement attempts; providing a fitness function $J=\int |f_{AS}-f_{CS}| dt$ having as variables: $f_{AS}(t)$=the registered clutch actuator feedback signal and $f_{CS}(t)$=the estimated clutch actuator control signal; initializing random particle position and velocity; evaluating the fitness function for each particle's position; updating the velocity and the position of each particle; and checking whether J=0 is satisfied, and if yes the initial phase shift has been identified, otherwise iterating the steps of evaluating the fitness function for each particle's position, updating the velocity and the position of each particle, and checking whether J=0 is satisfied. These method steps reflect the particle swarm optimization search algorithm and provide a robust and easily implemented approach for identifying the initial phase shift.

In some example embodiments, the clutch actuator feedback signal is any of, or a combination of: supply voltage over an electrical clutch actuator motor, supply current to the electrical clutch actuator motor, hydraulic pressure of a hydraulic actuator motor or piston, contact pressure applied by the clutch actuator on the first clutch portion, motion of a component associated with the clutch actuator or first clutch portion. All these various types of signals may be used clutch actuator feedback signal because they may all be used for detecting whether a clutch engagement attempt results in teeth collision or proper intermeshing teeth engagement without teeth interference in an engagement direction.

In some example embodiments, the first clutch portion of the dog clutch is a shift sleeve of a stepped gear transmission of the drivetrain, wherein the shift sleeve is rotationally fastened to, and axially displaceable with respect to, a transmission shaft, and the second clutch portion of the dog clutch is a first freewheeling gear arranged on, and rotatable relative to, said transmission shaft.

In some example embodiments, each of the first and second clutch portions of the dog clutch has a circular disk-like shape with a set of teeth protruding in an axial direction of the dog clutch.

In some example embodiments, the shift sleeve is free from a mechanical synchroniser device. This stems from the fact that the clutch actuator is configured for being controlled to perform clutch engagement at a time point that results in interference-free clutch engagement, i.e. without teeth collision in the clutch engagement direction, thereby enabling clutch engagement without prior rotational synchronisation.

In some example embodiments, the method comprises the steps of providing a first electrical propulsion motor drivingly connected with the first clutch portion; and providing a second electrical propulsion motor drivingly connected with the second clutch portion. Thereby, the method for operating a vehicle drivetrain including a dog clutch may be used for teeth collision-free engagement of the dog clutch when rotationally connecting the first and second electrical motor, such as when both electrical motors are used simultaneously for propulsion.

The disclosure also relates to a vehicle comprising the vehicle drive train described above.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The disclosure will be described in detail in the following, with reference to the attached drawings, in which FIG. 3A shows schematically the basic steps of the method according to the disclosure, FIG. 3B shows schematically an example embodiment of a mathematical model of the drivetrain.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

This disclosure presents a model based control strategy aimed to reduce noise and wear during a dog clutch engagement process. Dog clutch engagement process may for example occur during automatic gearshifts in a stepped transmission, such as for example an automatic single or dual clutch transmission, or an automated manual transmissions (AMT), or the like. Alternatively, or in addition, dog clutch engagement process may occur when shifting a conventional dog clutch from disengaged state to engaged state. A conventional dig clutch herein refers to a dog clutch having a first clutch portion rotationally fixed to a first shaft, a second clutch portion rotationally fixed to a second shaft that is separate but aligned with the first shaft.

The use of a relatively simple and robust dog clutch for gear shifts instead of the conventional more complex and costly mechanical synchroniser, enables a more cost-efficient overall design, and the control strategy based on detected or estimated angular position of the first and second clutch portions of the dog clutch, as well as knowledge of the initial phase shift, provides interference-free low-noise engagement with little wear.

Figure 1A:
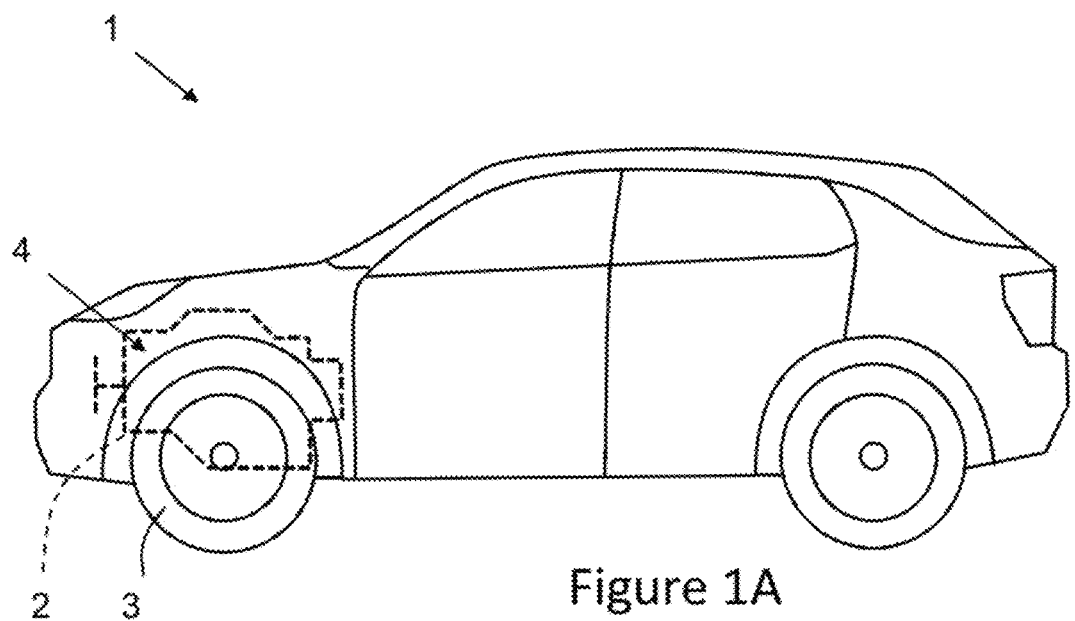
FIG. 1A shows schematically a side-view of a vehicle having a drivetrain.

For setting the vehicle drivetrain of the disclosure in a context, FIG. 1A shows an example embodiment of a car 1 having a drivetrain 4 including a propulsion power source 2, such as internal combustion engine and/or an electric motor, drivingly connected to driving wheels 3 of the car 1 via a transmission, such as an automatic stepped gear transmission, i.e. an automatic transmission with a plurality of discrete gears each having a unique gear ratio.

Figure 1B:
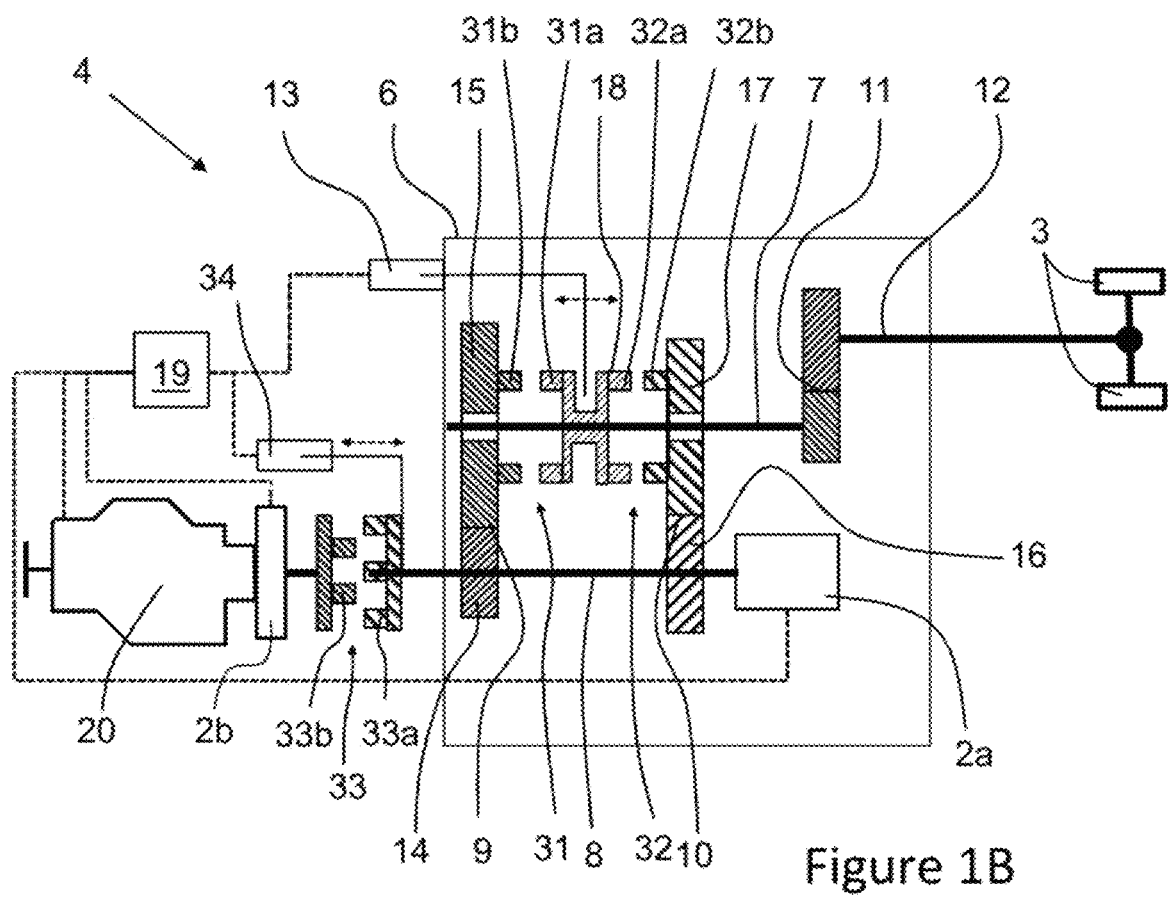
FIG. 1B shows schematically a layout of an example embodiment of a drivetrain.

A schematic illustration of a simplified two-gear version of a drivetrain 4 of an automated stepped transmission is shown in FIG. 1B. In this example embodiment, the drivetrain 4 comprises an internal combustion engine 20, a first dog clutch 5, a transmission 6 and a set of driving wheel 3. The transmission according to this example simplified embodiment has a transmission main shaft 7, a transmission input shaft 8, a first constant mesh gear 9 having an initial gear ratio, a second constant mesh gear 10 having a target gear ratio, a final constant mesh gear 11 having a final drive ratio and a driveshaft 12, and a first electrical motor 2a drivingly connected to the transmission input shaft 8.

The first constant mesh gear 9 includes a fixed gear 14 rotationally secured to the transmission input shaft 8 and in constant mesh with a first idler gear 15, or freewheeling gear, arranged on and rotatable relative to said transmission main shaft 7, and the second constant mesh gear 10 includes a fixed gear 16 rotationally secured to the transmission input shaft 8 and in constant mesh with a second idler gear 17, or freewheeling gear, arranged on and rotatable relative to said transmission main shaft 7.

An axially displaceable shift sleeve 18 is arranged on and rotationally secured to the main shaft 7. The shift sleeve 18 comprises a first set of teeth 31a arranged on a first axial side of the shift sleeve 18, and a second set of teeth 32a arranged on a second axial side of the shift sleeve 18. The shift sleeve may be axially shifted by an axial force providable by a first clutch actuator 13.

Consequently, when the clutch actuator 13 moves the shift sleeve towards the left in FIG. 1B, the first set of teeth 31a engages a corresponding first set of teeth 31b of the first idler gear 15. Similarly, when the clutch actuator 13 moves the shift sleeve towards the right in FIG. 1B, the second set of teeth 32a engage a corresponding second set of teeth 32b of the second idler gear 17. Hence, the first set of teeth 31a and corresponding first set of teeth 31b jointly form a first dog clutch 31, and the second set of teeth 32a and corresponding second set of teeth 32b jointly form a second dog clutch 32.

As illustrated in FIG. 1B, the drivetrain 4 may additionally include a third dog clutch 33 having a first clutch portion with a first set of teeth 33a and a second clutch portion with a second set of teeth 33b. A second clutch actuator 34 controls the axial position of the first clutch portion for setting the third dog clutch in engaged or disengaged state, thereby enabling drivingly connection or disconnection of the internal combustion engine 20 to the transmission 6.

Figure 2A:
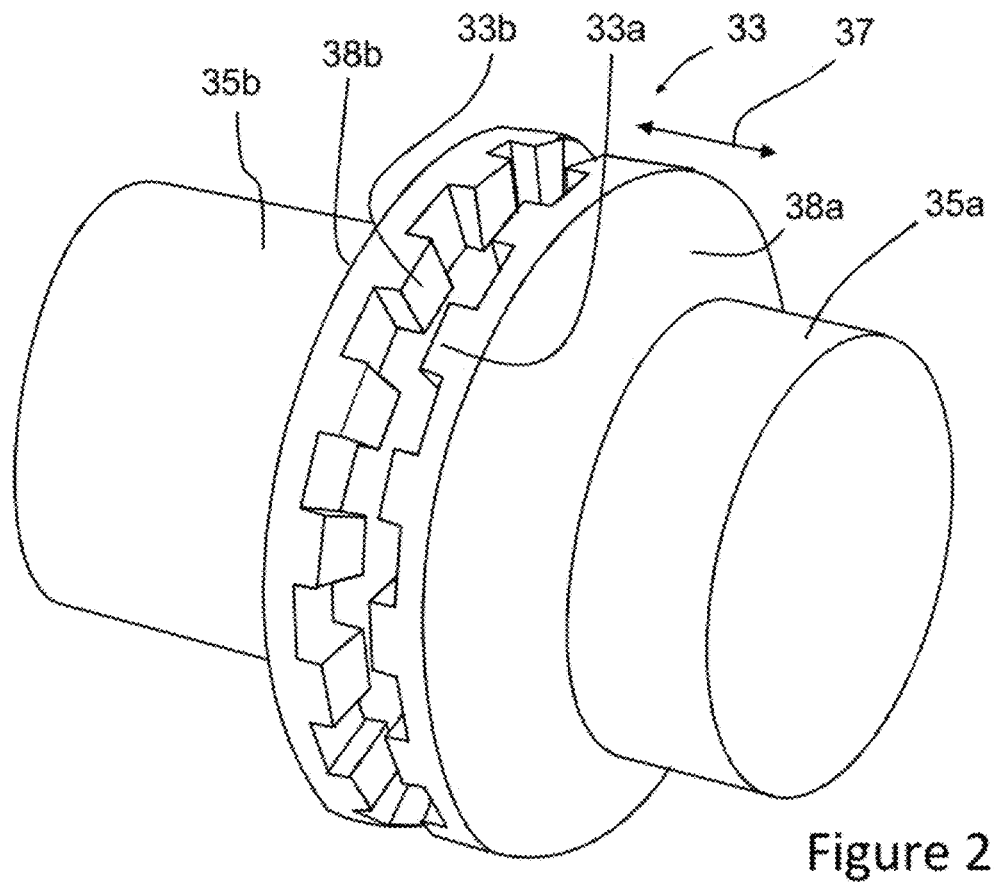
FIG. 2A-2C show schematically a dog clutch in a disengaged state, engaged state, and teeth collision state, respectively.
Figure 2B:
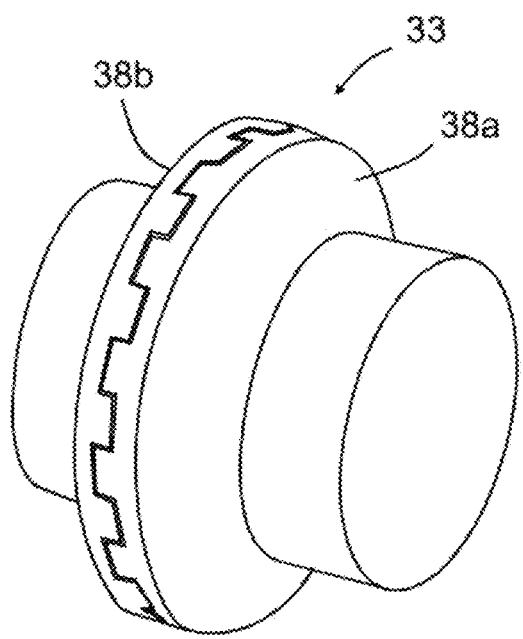

The third dog clutch 33 may be of a conventional type, as schematically illustrated in FIG. 2A in a disengaged state and FIG. 2B in a successful engaged state, having a first clutch portion 38a rotationally fixed to a first shaft 35a, a second clutch portion 38b rotationally fixed to a second shaft 35b that is separate from but aligned with the first shaft 35a. Shifting of the dog clutch 33 from the disengaged state to engaged state involves axial motion of one or both of the clutch portions 38a, 38b, in an axial direction 37, until the first set of teeth 33a enters into the recesses formed by the teeth of the second set of teeth 33b, thereby resulting in a successful mutual intermeshing engagement of the first and second sets of teeth 33a, 33b, without any teeth interference.

Figure 2C:
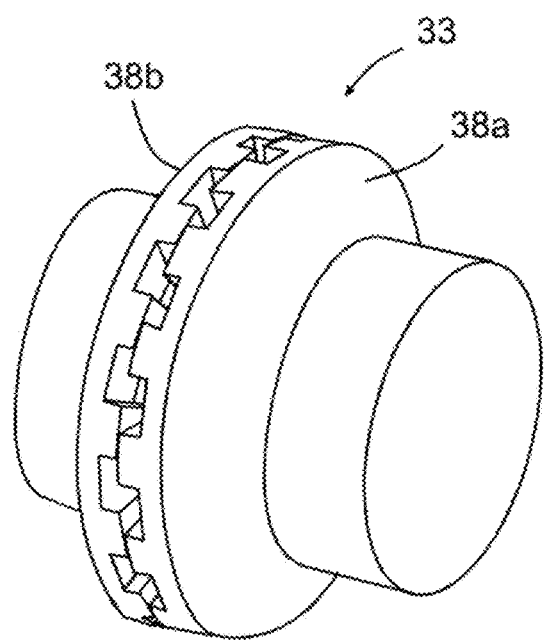

If the dog clutch 33 is shifted from disengaged state to engaged state at an incorrect angular relative angle between the first and second clutch portions 38a, 38b, there will be a teeth collision of the first and second sets of teeth 33a, 33b, as schematically illustrated in FIG. 2C.

In other words, the first clutch portion of the dog clutch may be a shift sleeve of a stepped gear transmission of the drivetrain, wherein the shift sleeve is rotationally fastened to, and axially displaceable with respect to, a transmission shaft, and the second clutch portion of the dog clutch is a first freewheeling gear arranged on, and rotatable relative to, said transmission shaft, as schematically illustrated in FIG. 1B.

Alternatively, each of the first and second clutch portions 38a, 38b of the dog clutch 33 may have a circular disk-like shape with a set of teeth 33a, 33b protruding in an axial direction of the dog clutch 33, as schematically illustrated in FIGS. 1B and 2A.

In any case, the shift sleeve 18 may be free from a mechanical synchroniser device, i.e. merely provided with dog clutch teeth for accomplishing the required rotational connection with the idler gear. The shift sleeve must thus instead be rotationally synchronized with the idler gear by appropriate control of the first and/or second electrical motor 2a, 2b for ensuring matching angular position of the shift sleeve and idler gear before axially moving the shift sleeve towards engaged state with the idler gear.

In the example embodiment of FIG. 1B, the drivetrain further comprises a second electrical motor 2b drivingly connected with internal combustion engine 20.

The drivetrain 4 may include an electronic control system 19 configured for controlling operating of the first and second clutch actuators 13, 34, and the method of operating the drivetrain for accomplishing interference-free engagements relate to each of the first, second and third dog clutch 31, 31, 33.

For example, in a pure electrical drive mode, the third dog clutch 33 may be disengaged, i.e. set in an open state, and the first electrical propulsion motor 2a provides the necessary vehicle propulsion torque via one of the first and second constant mesh gears 9, 10, the shift sleeve 18, the having an initial gear ratio, a second constant mesh gear 10, the transmission main shaft 7, the final constant mesh gear 11, the driveshaft 12 and wheel 3.

In case of insufficient propulsion torque, the second electrical propulsion motor 2b may be controlled to first provide interference-free engagement of the third dog clutch and subsequently provide additional propulsion torque, with or without the internal combustion engine 20.

Consequently, the method of operating the drivetrain may include the steps of providing a first electrical propulsion motor 2a drivingly connected with the first clutch portion 38a, and providing a second electrical propulsion motor 2b drivingly connected with the second clutch portion 38b. Alternatively, the second electrical motor 2b and/or internal combustion engine 20 may be omitted from the drivetrain 4.

The angular position of the first and second clutch portions of each dog clutch 31-33 may be unknown in relation to the detected angular position of each respective angle detection device, i.e. the angle detection device the provides angular position data to the model based control system used for controlling the clutch actuators 13, 34, for example due to incorrect installation of the angle detection device, manufacturing tolerances, etc. However, without knowledge of the relative angular position between the first and second clutch portions that corresponds to dog clutch engagement position, an interference-free engagement of the dog clutch may be difficult to accomplish. Therefore, the method for operating the drivetrain may include not only a normal operating mode, but also an initial phase shift identifying mode for identifying the initial phase shift, which may then be used during subsequent normal operating mode.

Consequently, with reference to FIGS. 1A and 1B, an example embodiment of the vehicle drive train is illustrated, wherein the vehicle drive train 4 comprises a dog clutch 31-33 for selective torque transmission. The dog clutch 31-33 has a first clutch portion with a first set of teeth 31a-33a and a second clutch portion with a second set of teeth 31b-33b, wherein the first clutch portion is axially moveable for enabling shifting of the dog clutch 31-33 between an engaged state, in which the first and second clutch portions are operable to transmit torque between first and second clutch portion via the first and second set of teeth 31a-33a, 31b-33b, and a disengaged state, in which the first and second clutch portions are rotatable with respect to each.

The drivetrain 4 further comprises a first electrical propulsion motor 2a, 2b drivingly connected with one of the first and second clutch portions, a clutch actuator 13, 34 operably connected with the first clutch portion for shifting the dog clutch 31-33 between the engaged and disengaged states by controlling an axial position of the first clutch portion, and an electronic control system 19 configured for controlling the operation of the drivetrain 4 in at least two distinct operating modes: an initial phase shift identifying mode and a normal operating mode.

Specifically, the electronic control system 19 is configured for, when setting the drivetrain in the initial phase shift identifying mode, controlling the clutch actuator 13, 34 and the first electrical propulsion motor 2a, 2b for performing a plurality of clutch engagement movements for a set of different relative angles between the first and second clutch portions, while registering for each individual clutch engagement movement a clutch actuator feedback signal associated with the clutch actuator 13, 34 and indicative of either successful mutual intermeshing engagement of the first and second sets of teeth, or teeth collision of the first and second sets of teeth, and identifying, based on the registered clutch actuator feedback signal, the initial phase shift between the first and second clutch portions that corresponds to successful mutual intermeshing engagement of the first and second sets of teeth.

Moreover, the electronic control system 19 is configured for subsequently setting the drivetrain in a normal operating mode, which includes the steps of: obtaining angular position data associated with the first and second clutch portions, controlling engagement of the dog clutch while taking the obtained angular position data of first and second clutch portions, and said identified initial phase shift into account for enabling interference-free engagement of the of the dog clutch.

In said normal operating mode, the control system may for example initiate a dog clutch engagement in response to receiving a dog clutch engagement command from a user, a driver, or a software module within the control system. Engagement of the dog clutch engagement may for example be performed in connection with a gear shift or in connection with engagement of an additional propulsion motor that was previously disconnected from the active part of the drivetrain.

The disclosure also relates to a corresponding method, namely a method for operating a vehicle drivetrain 4 including a dog clutch and having at least two distinct operating modes: an initial phase shift identifying mode and a normal operating mode. The method is described more in detail below with reference to FIG. 3A, wherein the method comprises a first step S1 of providing:

a dog clutch for selective torque transmission, wherein the dog clutch has a first clutch portion with a first set of teeth and a second clutch portion with a second set of teeth, and wherein the first clutch portion is axially moveable for enabling shifting of the dog clutch between an engaged state, in which the first and second clutch portions are operable to transmit torque between first and second clutch portion via the first and second set of teeth, and a disengaged state, in which the first and second clutch portions are rotatable with respect to each, a first electrical propulsion motor drivingly connected with one of the first and second clutch portions, clutch actuator operably connected with the first clutch portion for shifting the dog clutch between the engaged and disengaged states by controlling an axial position of the first clutch portion.

The method further comprises a second step S2 of setting the drive train in the initial phase shift identifying mode, which includes the sub steps of:

controlling the clutch actuator and the first electrical propulsion motor for performing a plurality of clutch engagement movements for a set of different relative angles between the first and second clutch portions, while registering for each individual clutch engagement movement a clutch actuator feedback signal associated with the clutch actuator and indicative of either successful mutual intermeshing engagement of the first and second sets of teeth, or teeth collision of the first and second sets of teeth, and identifying, based on the registered clutch actuator feedback signal, the initial phase shift between the first and second clutch portions that corresponds to successful mutual intermeshing engagement of the first and second sets of teeth.

Finally, the method further comprises a third step S3 of setting the drivetrain in a normal operating mode, which includes the sub steps of:

obtaining angular position data associated with the first and second clutch portions, controlling engagement of the dog clutch while taking the obtained angular position data of first and second clutch portions, and said identified initial phase shift into account for enabling interference-free engagement of the of the dog clutch.

The second and third steps S2, S3 of setting the drive train in the initial phase shift identifying mode and subsequently setting the drivetrain in a normal operating mode may be initiated automatically be a vehicle internal control system or vehicle remote service partner, for example upon detecting non-smooth gear engagements, or the like.

Moreover, the second step S2 of setting the drive train in the initial phase shift identifying mode may be performed when the vehicle is at still stand, such as during parking, with or without a driver or passenger within the vehicle. Alternatively, said second step S2 may be performed in connection with use of the vehicle, such as during temporary vehicle still stand in connection with for example passing a road crossing, waiting for green traffic light, queuing in traffic jam, etc., or even when vehicle is actually moving, such as during coasting, etc., depending on the configuration of each specific drivetrain.

The second step S2 of setting the drivetrain in the initial phase shift identifying mode is typically performed at least in connection with manufacturing of the vehicle, because at this stage the relative angular assembly position of the first and second cutch portions and associated angle detection devices are often still unknown. Moreover, as indicated above, the second step S2 of setting the drivetrain in the initial phase shift identifying mode is typically performed in connection with vehicle maintenance for calibrating the initial phase angle in view of wear, damages, etc. that might occur during use of the drivetrain.

The second step S2 of controlling the clutch actuator and the first electrical propulsion motor for performing a plurality of clutch engagement movements for a set of different relative angles between the first and second clutch portions, while registering for each individual clutch engagement movement a clutch actuator feedback signal, and identifying the initial phase shift between the first and second clutch portions, may be initiated manually, such as for example by a service personnel during vehicle service, or remotely by a service-provider. Alternatively, said second step S2 may be initiated automatically by the vehicle control system or a software monitoring application running on a remote server of for example a service-provider. The second step S2 may be performed with or without a driver or passenger within the vehicle.

The second step S2 may include a sub step of selecting the set of different relative angles between the first and second clutch portions such that the set includes a plurality, in particular at least 5, specifically at least 20, of individual relative angles. A larger number of individual relative angles within the set results in increased computational effort for identifying the initial phase shift, but may on the other hand result in a more accurate value of the initial phase shift.

In practice, the set of different relative angles between the first and second clutch portions may for example be obtained by performing a plurality of quick clutch engagement-disengagement movements, with a certain time interval between consecutive movement, while controlling the electric motor to provide a certain constant relative rotational speed between the first and second clutch portions. Alternatively, each of the plurality of quick clutch engagement-disengagement movements may be performed with stationary first and second clutch portions, and with the electric motor providing a new rotational relative angle between the first and second clutch portions between each individual sampling time.

The individual relative angles within the set of different relative angles may be evenly distributed. Thereby, the likelihood of more quickly finding an acceptable initial phase shift is increased.

The method may include the step of selecting the end points of the set of different relative angles between the first and second clutch portions sufficiently wide for ensuring including at least one clutch dog engagement position. In other words, the end points are selected dependent on the number of teeth of the dog clutch, wherein said end points are selected to extend over a sufficiently large circular sector for with ensuring that a matching position of the first and second clutch portions is included.

As mentioned above, the second step S2 is dependent on the clutch actuator feedback signal for identifying the initial phase shift of the dog clutch. However, since the clutch actuator may be an electromechanical actuator, a fluid or air powered actuator, etc. the feedback signal may have various forms and character. Moreover, a successful engagement of the dog clutch may also be verified by other parameters associated with the clutch actuator, such as axial engagement length [mm] of moving clutch portion, motion (linear, angular, etc.) of a mechanical linkage element of the clutch actuator or associated element, contact pressure, etc.

Consequently, the clutch actuator feedback signal may be any of, or a combination of: supply voltage over an electrical clutch actuator motor, supply current to the electrical clutch actuator motor, hydraulic pressure of a hydraulic actuator motor or piston, contact pressure applied by the clutch actuator on the first clutch portion, motion of a component associated with the clutch actuator or first clutch portion.

There are various types a learning algorithms available that may be used for identifying the initial phase angle based on knowledge of the control actuator feedback signal. Two specifically relevant learning algorithms suitable for this task are the direct comparison search algorithm and the particle swarm optimization search algorithm.

In other words, said second step S2 step of controlling the clutch actuator and the first electrical propulsion motor for performing a plurality of clutch engagement movements for a set of different relative angles between the first and second clutch portions, while registering for each individual clutch engagement movement the clutch actuator feedback signal, and identifying the initial phase shift between the first and second clutch portions that corresponds to a clutch actuator feedback signal indicative of successful mutual intermeshing engagement of the first and second sets of teeth, may be part of applying a direct comparison search algorithm for identifying said initial phase shift.

Alternatively, said second step S2 step of controlling the clutch actuator and the first electrical propulsion motor for performing a plurality of clutch engagement movements for a set of different relative angles between the first and second clutch portions, while registering for each individual clutch engagement movement the clutch actuator feedback signal, and identifying the initial phase shift between the first and second clutch portions that corresponds to successful mutual intermeshing engagement of the first and second sets of teeth, may be part of applying a particle swarm optimization search algorithm for identifying said initial phase shift.

A mathematical model of an example embodiment of a drivetrain including a dog clutch for gear shifting will be described below for the purpose of describing one detailed example approach for implementing the method and drivetrain according to the disclosure.

A mathematical drivetrain model of the drivetrain similar to that of FIG. 1B is shown in FIG. 3B. In this example embodiment, we assume that the third dog clutch 33 is disengaged and the first electrical propulsion motor is the sole propulsion source. Consequently, the propulsion power is transmitted from the electrical propulsion motor, such as a permanent magnetized synchronous machine (PMSM), through the gears 9, 10 and shafts 8, 7,12 and finally to the output wheels 3. The PMSM is here is simplified into an ideal torque source giving $T_e$.

Engagement of the first dog clutch 31 involves axial motion of the shift sleeve 18 towards first idler gear 15. Hence, a first clutch portion of the first dog clutch is the shift sleeve 18 and the second clutch portion of the first dog clutch 31 is the first idler gear 15.

The letters "R" and "C" in FIG. 3B stand for transmission direction. In other word, the force is positive if it acts in the direction from R to C.

Assuming stiffness and damping rate of input shaft is $k_{is}$ and $d_{is}$, inertia of shift sleeve and input shaft is $J_{sl}$ and $J_{is}$, the movement could be described with Newton's second law:

$$T_e = J_{is}\frac{d\omega_{is}}{dt} + k_{is}(\phi_{is} - \phi_{sl}) + d_{is}(\omega_{is} - \omega_{sl}) \quad (1)$$

$$k_{is}(\phi_{is} - \phi_{sl}) + d_{is}(\omega_{is} - \omega_{sl}) + T_L = J_{sl}\frac{d\omega_{sl}}{dt}, \quad (2)$$

where $\phi_{sl}$ and $\phi_{is}$ stand for angular displacement of shift sleeve 18 and input shaft, $\omega_{sl}$ and $\omega_{is}$ stand for angular velocity of shift sleeve 18 and input shaft.

Assuming the output shaft of the gear shifting system is not rigid, flexibility in the connection stiffness of output shaft is $k_{os}$, the damping rate (friction) is $d_{os}$ and the driving torque applied on idler gear is $T_{syn}$, the dynamic model is:

$$T_{syn} - T_L = J_{ig}\frac{d\omega_{ig}}{dt} + k_{os}(\phi_{ig} - \phi_{os}) + d_{os}(\omega_{ig} - \omega_{os}) \quad (3)$$

$$k_{os}(\phi_{ig} - \phi_{os}) + d_{os}(\omega_{ig} - \omega_{os}) = J_{output}\frac{d\omega_{os}}{dt} + T_{tire} \quad (4)$$

$$J_{output} = J_{os} + J_{og} + J_{tire}. \quad (5)$$

In the above formulations, $T_{tire}$ refers to load torque on tire. $\phi_{ig}$ and $\omega_{ig}$ are angular displacement and angular velocity of idler gear 15, and $\phi_{os}$ and $\omega_{os}$ for that of shifting output shaft. $J_{ig}$, $J_{os}$ and $J_{og}$ refer to the inertia of idler gear 15, shifting output shaft and the output gear engaged with idler gear 15.

Figure 4:
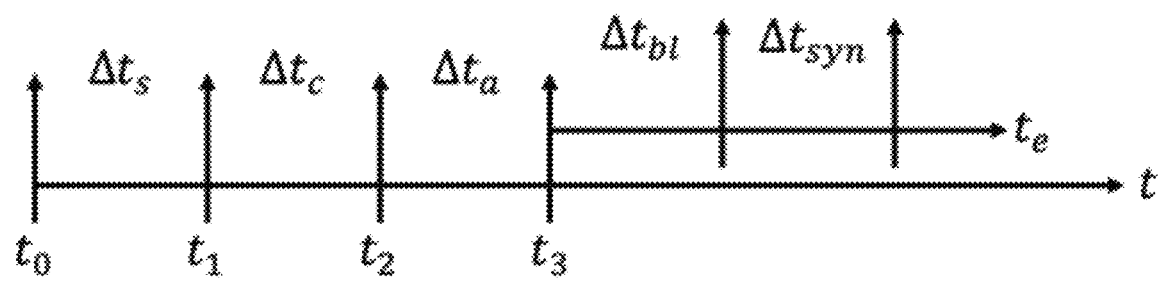
FIG. 4 shows schematically a time sequence reflecting various different phases during a dog clutch engagement.

With reference to FIG. 4, an engagement process could be divided into four phases in order to simplify the model:

a) Phase 1 (within $\Delta t_s$)—there is no outside-system effect.

b) Phase 2 (within $\Delta t_c$)—the shifting starts at moment $t_1$ triggered for example manually by the driver or automatically by the electronic control system. In phase 2, the system does the calculation and approves the gear engagement.

c) Phase 3 (within $\Delta t_a$)—the actuator moves the shift sleeve 18 towards the idler gear 15.

d) Phase 4 (from $t_3$)—gear engagement.

Phase 1—Individual Movement

Figure 5:
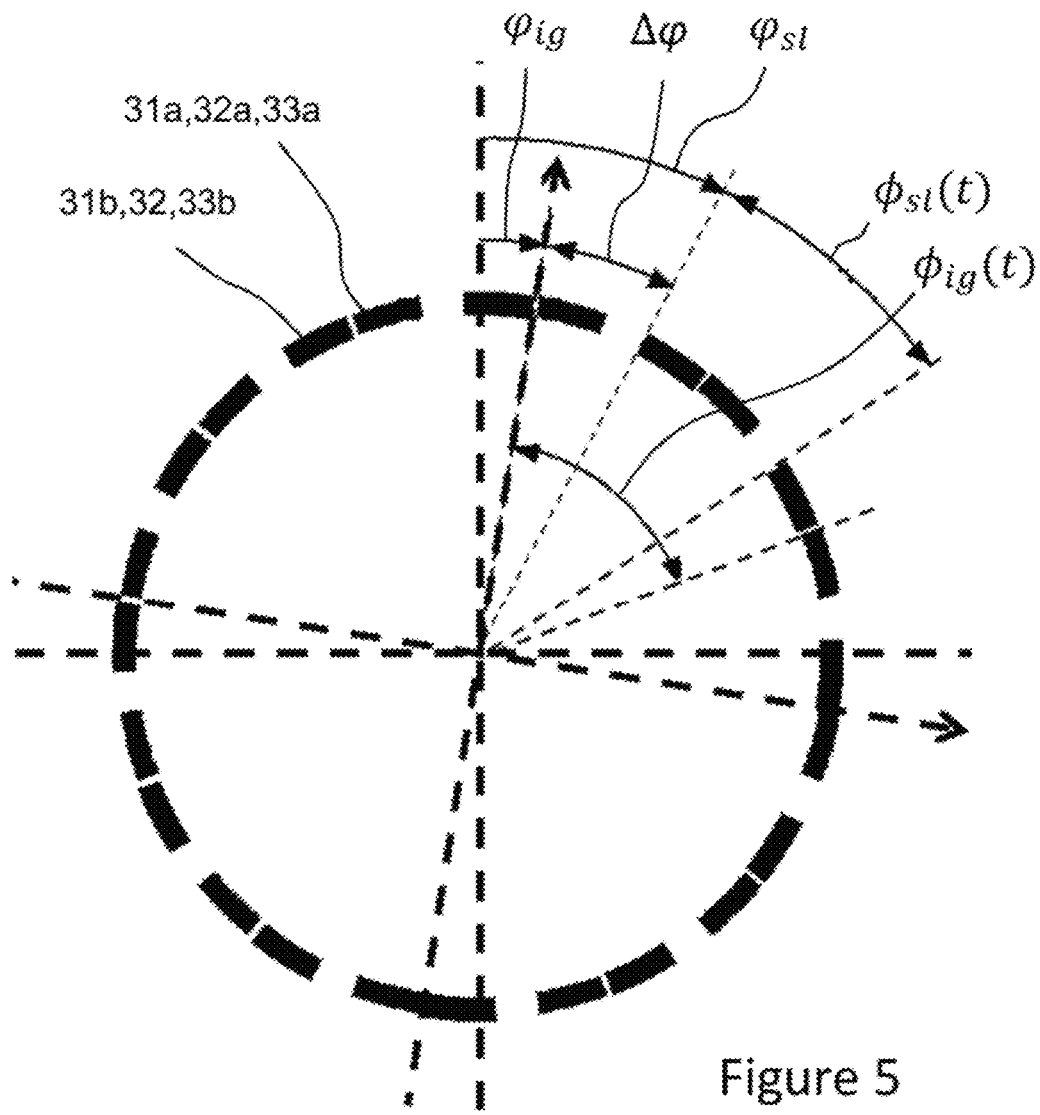
FIG. 5 shows schematically an example of an angular state of the dog clutch at a certain time moment including definition of various parameters.

As schematically shown in FIG. 5, the shift sleeve 18 and idler gear 15 define a certain relative angle, i.e. an angular difference between the shift sleeve 18 and the idler gear 15 that is defined as the initial phase shift $\Delta\phi$, the angular displacement of them are $\phi_{sl}$ and $\phi_{ig}$, the time-varied position of shift sleeve and idler gear are:

$$\phi_{sl,total}(t) = \phi_{sl}(t) + \Delta\phi \quad (6)$$

$$\phi_{ig,total}(t) = \phi_{ig}(t). \quad (7)$$

As discussed above, these two angular displacement signals may be obtained by angle detection devices, such as angular position sensors, angular speed sensors with absolute marking, encoders, transducers, or by estimating the angular position based on known values of some parameters of the electrical propulsion motor, such as rotor flux position, stator flux, output torque, slip velocity, etc. The initial phase shift $\Delta\phi$ may be obtained by running an initial phase shift identification algorithm.

Phase 2—System Calculation

The estimation should be done based on the signal from for example a sensor before and at the instant $t_1$. $\phi_{gap}$ is the angle between two nearest tooth tips. To define the dog tooth which is closest to the zero-position as the critical tooth, the critical angle and the critical displacement for engagement are calculated with the modulo operation:

$$\phi_{sl,c} = \phi_{sl,total}(t_1) - \text{floor}\left(\frac{\phi_{sl,total}(t_1)}{\phi_{gap}}\right) * \phi_{gap} \quad (8)$$

$$= [\phi_{sl,total}(t_1)] \bmod [\phi_{gap}]$$

$$\phi_{ig,c} = [\phi_{ig,total}(t_1)] \bmod [\phi_{gap}] \quad (9)$$

The criterion to approve gear shifting in angle form is:

$$\phi_{dog} \le |\phi_{ig,c} - \phi_{sl,c}| \le \phi_{dog} + \phi_c \left(\phi_{dog} = \frac{w_{dog}}{r_{sl}}, \phi_c = \frac{c}{r_{sl}}\right) \quad (10)$$

Given $r_{sl}$ as sleeve mean radius, formula 9, 10 and 11 could also be written with tangential displacement:

$$\begin{cases} w_{dog} \le |y_{ig,c} - y_{sl,c}| \le w_{dog} + c \\ y_{sl,c} = \phi_{sl,c} \cdot r_{sl} \\ y_{ig,c} = \phi_{ig,c} \cdot r_{sl} \end{cases} \quad (11)$$

The estimation results in a control signal function:

$$f_{CS}(t) = \begin{cases} 1, & \text{when } \phi_{dog} \le |\phi_{ig,c} - \phi_{sl,c}| \le \phi_{dog} + \phi_c \text{ is fulfilled} \\ 0, & \phi_{dog} \le |\phi_{ig,c} - \phi_{sl,c}| \le \phi_{dog} + \phi_c \text{ is not fulfilled} \end{cases} \quad (12)$$

Phase 3—Actuation Movement

Assuming the geometry and size of shift sleeve 18 are the same as the idler gear 15. During the engagement, the shift sleeve 18 moves forward to the idler gear 15 no matter how much the relative velocity is, which is different from ordinary synchronizer with friction pair engaging only when the relative velocity reaches zero.

Figure 6:
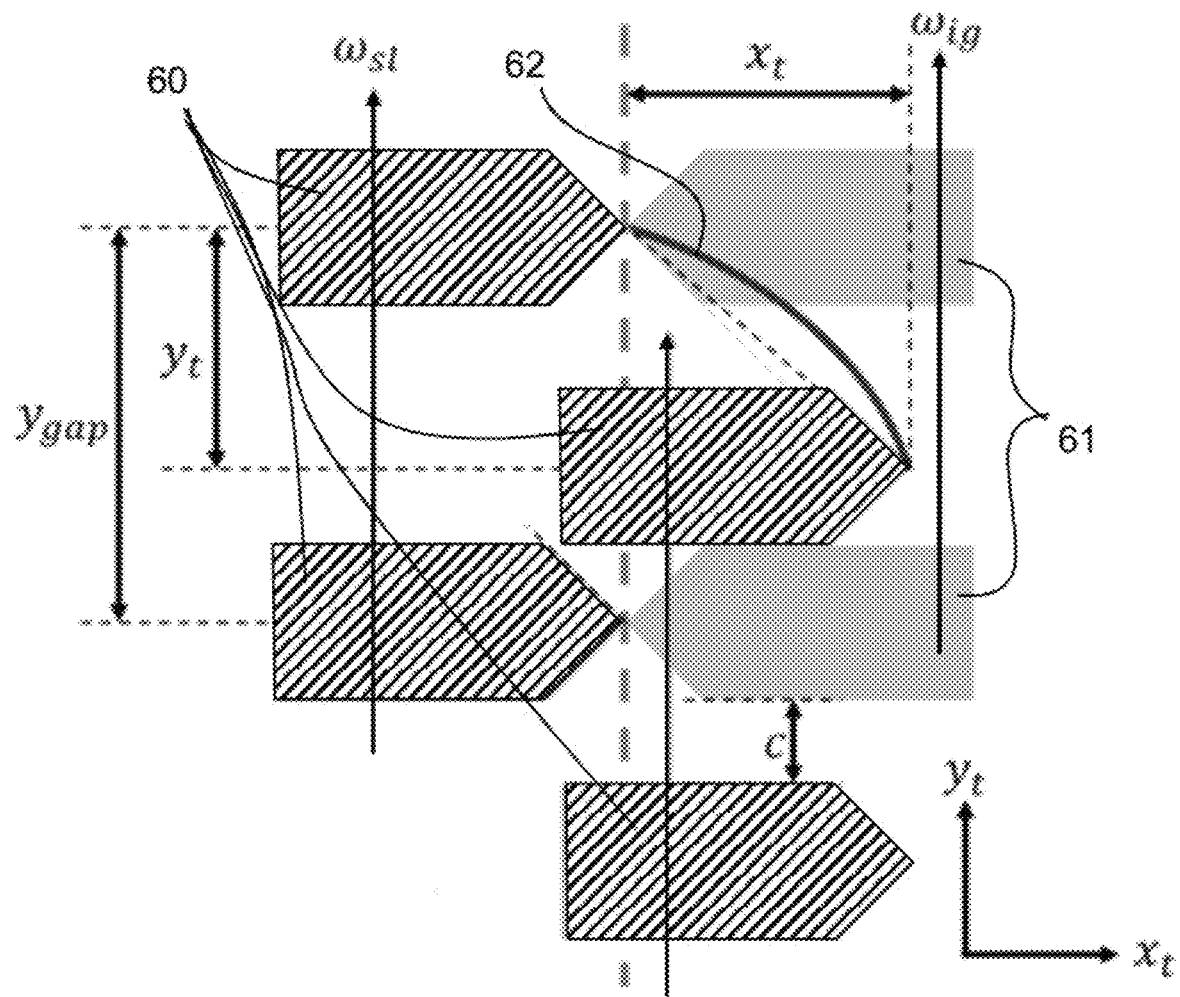
FIG. 6 shows schematically the set of teeth of a first clutch portion in two different engagement positions.

In FIG. 6, the hatched teeth 60 refer to shift sleeve in two different engagement positions and the solid teeth 61 refer to the idler gear. The solid curve 62 is the trajectory of the shift sleeve teeth during engagement motion. Given the number of dog teeth $n_{dog}$, the distance between each pair of teeth is $y_{gap}$ corresponding to angle $\phi_{gap}$:

$$\phi_{gap} = 2\pi/n_{dog} \quad (13)$$

$$y_{gap} = 2\pi r_{sl}/n_{dog} \quad (14)$$

With teeth width $w_{dog}$ and clearance between teeth c corresponding to angle $\phi_c$, the distance between each pair of teeth $y_{gap}$ can also be written as:

$$y_{gap} = 2w_{dog} + c \quad (15)$$

$$\phi_c = c/r_{sl} \quad (16)$$

Within phase 3, the relative displacement along rotational direction is $y_{rela}$ and $x_{rela}$ in axial direction. Assuming actuator reaction time is zero and the actuator to the shift sleeve moves on constant velocity $\dot{x}_{sl}$:

$$x_{rela}(t) = \int_{t_3}^{t_2} \dot{x}_{sl} dt \quad (17)$$

$$y_{rela}(t) = \int_{t_3}^{t_2} r_{sl}(\omega_{ig} - \omega_{sl}) dt \quad (18)$$

$$\tan \gamma_t(t) = \frac{y_{rele}}{x_{rele}} \quad (19)$$

where $\gamma_t(t)$ is displacement angle; If $|\gamma_t(t)|$ is smaller than teeth half angle $\gamma$, the shift sleeve hits the idler gear.

Phase 4—Gear Engagement

In this phase, there are actually two respective motion—the shift sleeve moves toward the idler gear and they are engaged together.

$F_a$ stands for clutch actuator force, $m_{sl}$ is shift sleeve mass and $x_{oa}$ refers to axial displacement from actuator output. In case the clutch actuator is an electro-mechanical actuator, the clutch actuator comprises an electric part and a mechanical part which could be expressed in such formulations:

$$u = r_m i_a + L_m \frac{di_a}{dt} + k_{emf} \dot{x}_{oa} \quad (20)$$

$$F_a = k_m i_a. \quad (21)$$

The clutch actuator may be controlled using a regulator, such as for example a feedback PD controller:

$$F_a - F_{f,a} = k_a(x_{sl} - x_{oa}) + d_a(\dot{x}_{sl} - \dot{x}_{oa}) + m_{sl}\ddot{x}_{sl} \quad (22)$$

$$u_c = k_{cp}(x_{a,ref} - x_{oa}) + k_{cd}(\dot{x}_{a,ref} - \dot{x}_{oa}) \quad (23)$$

where $k_a$ and $d_a$ stand for the spring rate and damping rate of actuator. $F_{f,a}$ is the friction force on clutch actuator, which is:

$$F_{f,a} = \mu \frac{T_L}{r_{sl}} \quad (24)$$

$u_c$ signal could be used to detect successful and unsuccessful dog clutch engagement, because the $u_c$ signal may include a voltage spike upon teeth collision between the shift sleeve and idler gear, and be free from a voltage spike in case of successful engagement, i.e. interference-free engagement of the teeth of the shift sleeve and idler gear.

When the shift sleeve 18 and the idler gear 15, considering the connection between them as a torsional oscillation and taking backlash into account, the torque in the torsional spring transmitted is:

$$T_L = \begin{cases} k_c\left(\Delta\phi_e + \frac{\phi_c}{2}\right) & \text{for } \Delta\phi_e \le -\frac{\phi_c}{2} \\ 0 & \text{for } -\frac{\phi_c}{2} \le \Delta\phi_e \le +\frac{\phi_c}{2} \\ k_c\left(\Delta\phi_e - \frac{\phi_c}{2}\right) & \text{for } \Delta\phi_e \ge \frac{\phi_c}{2} \end{cases} \quad (25)$$

$$= \frac{k_c}{2}\left[\Delta\phi_e - \frac{\phi_c}{2}\text{sign}(\Delta\phi_e)\right]\left[1 + \text{sign}\left(|\Delta\phi_e| - \frac{\phi_c}{2}\right)\right]$$

where $\phi_{ig,e}$=angular displacement of idler gear in gear engagement phase;

$\phi_{sl,e}$=angular displacement of shifting output shaft in gear engagement phase;

$k_c$=gear engagement spring rate.

$\Delta\phi_e = \phi_{ig,e} - \phi_{sl,e}$ $\phi_{ig,e} = \phi_{ig,total}(t) - \phi_{ig,total}(t_3)$ $\phi_{sl,e} = \phi_{sl,total}(t) - \phi_{sl,total}(t_3)$ If considering both spring and damping, giving $k_c$ as gear engagement spring rate and $d_c$ as gear engagement damping rate:

$$T_L = \begin{cases} k_c\left(\Delta\phi_e + \dfrac{\phi_c}{2}\right) + d_c(\omega_{ig} - \omega_{sl}) & \text{for } \Delta\phi_e \leq -\dfrac{\phi_c}{2} \\ 0 & \text{for } -\dfrac{\phi_c}{2} \leq \Delta\phi_e \leq +\dfrac{\phi_c}{2} \\ k_c\left(\Delta\phi_e - \dfrac{\phi_c}{2}\right) + d_c(\omega_{ig} - \omega_{sl}) & \text{for } \Delta\phi_e \geq \dfrac{\phi_c}{2} \end{cases} \quad (25\text{-}2)$$

Identification of Initial Phase Shift Angle

Two different phase shift angle identification methods are described in detail below. The method and drivetrain of the present disclosure are however not restricted to any of these two methods, but other methods may be used as well, such as for example Binary Search method, use of an artificial neural network, etc.

A first method for identifying the initial phase shift angle involves comparing an estimated actuator signal with the actual actuator signal and is referred to as direct comparison algorithm and will be described below.

Figure 7A:
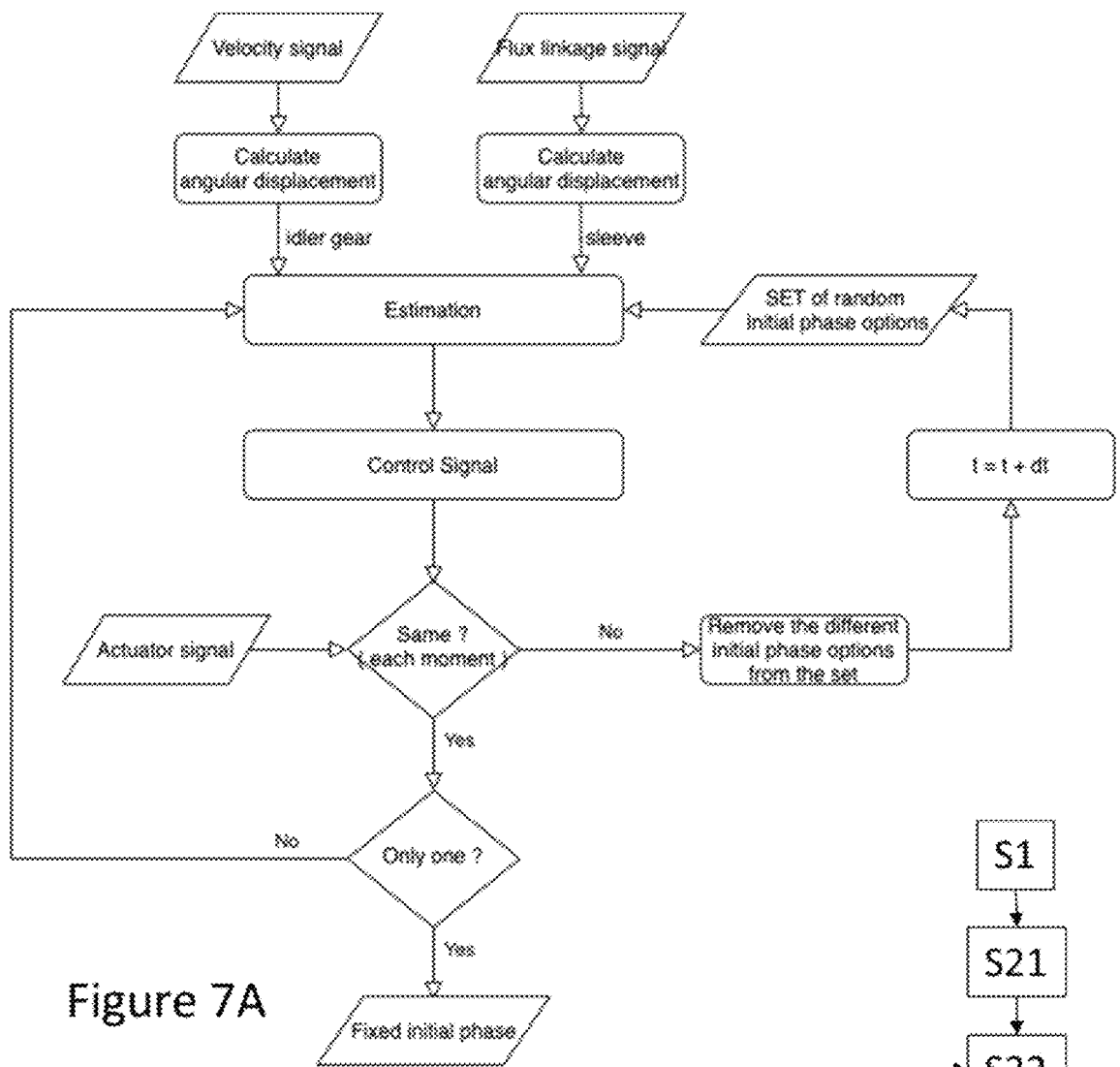
FIG. 7A shows schematically a flow chart illustrating some relevant aspects of the direct comparison search algorithm.

Provided knowledge of certain angular displacement signals, i.e. angular position data, of the idler gear 15 and shift sleeve 18, a certain initial phase shift leads to a certain estimation result of the clutch actuator signal, also referred to as clutch actuator feedback signal or control signal, which is calculated with the estimation criterion (equation No. 10). In this search algorithm, of which the flowchart is shown in FIG. 7A, the estimated control signal is compared directly with the actual actuator signal and a new clutch engagement is performed at each iteration.

In short, to begin with a set of potential initial phase shift angles is selected including for example about 10-150 individual and unique possible initial phase shift angles. The direct comparison algorithm will then stepwise remove those possible initial phase shift angles that are deemed incorrect/faulty until only a single initial phase shift is remaining.

The end values of the set of potential initial phase shift angles may for example be zero and $\phi_{gap}$, which denotes the angle between two nearest tooth tips.

Thereafter, the clutch actuator 13, 34 is controlled to perform a single quick clutch engagement sequence, while the clutch actuator feedback signal is recorded or at least monitored, and the angular position data of each clutch portion is registered by means of some type of angular displacement detection device associated with each clutch portion, and/or by means of estimated rotor flux angular position of the electric motor connected to a clutch portion, or the like. A single quick clutch engagement sequence refers herein to a relatively swift axial motion from the disengaged state towards the engaged state, and back again to the disengaged state after having reached either a fully engaged state, as illustrated in FIG. 2B, or a teeth collision state, as illustrated in FIG. 2C.

Thereafter, for each of the set of potential initial phase shift angles, an estimated relative angular engagement position is calculated, based on the registered angular position data of each clutch portion. In other words, a set of different potential angular engagement positions are estimated.

Based on this set of estimated different potential angular engagement positions, a set of corresponding estimated clutch actuator control signals are determined. The clutch actuator control signal associated with the clutch actuator is indicative of either successful mutual intermeshing engagement of the first and second sets of teeth, or teeth collision of the first and second sets of teeth.

As discussed above, since the clutch actuator 13, 34 may be an electromechanical actuator, a fluid or air powered actuator, etc. the clutch actuator control signal may have various forms and character. Moreover, a successful engagement of the dog clutch 31-33 may also be verified by other parameters associated with the clutch actuator 13, 34, such as axial engagement length [mm] of a moving clutch portion, motion (linear, angular, etc.) of a mechanical linkage element of the clutch actuator or associated element, contact pressure, etc.

Consequently, the feedback signal associated with the clutch actuator 13, 34 and used for indicating whether the clutch engagement is successful or not, i.e. the clutch actuator feedback signal, may be any of, or a combination of: supply voltage over an electrical clutch actuator motor, supply current to the electrical clutch actuator motor, hydraulic pressure of a hydraulic actuator motor or piston, contact pressure applied by the clutch actuator on the first clutch portion, motion of a component associated with the clutch actuator or first clutch portion When the set of estimated clutch control signals is calculated, each individual estimated clutch control signal is compared with the clutch actuator feedback signal that was recorded or at least monitored during the engagement sequence, and the initial phase shifts associated with those estimated clutch control signals that do not match the registered clutch actuator feedback signal are removed from the set of initial phase shifts.

In other words, those estimated clutch control signals, from the set of estimated clutch control signals, that do not match with the registered clutch actuator feedback signal, are identified and the corresponding initial phase angles are deleted from the set of initial phase shift options.

The comparison for determining matching or non-matching signals may be straightforward when the estimated clutch control signals and registered clutch actuator feedback signal are of Boolean character, i.e. either zero or one, or "successful engagement" or "non-successful engagement", as shown in equation 12 above. If however analog or time varying signals are compared, a more sophisticated matching algorithm including for example one or more threshold values may be used for detecting voltage spikes or the like.

If only one initial phase remain from the set of initial phase options, the search algorithm stops and the final initial phase is equal to the single remaining initial phase, otherwise the clutch actuator is controlled to perform a new single quick clutch engagement sequence at a new relative angular position of the first and second clutch portions, and the algorithm iterates through the steps described above again based on the remaining initial phase options, i.e. the initial phase options that still have not been deleted.

The new relative position of the first and second clutch portions may for example be accomplished by merely waiting a short time period "dt", as showed in FIG. 7A, in case one of the first and second clutch portions is rotating. Alternatively, the electric motor 2a, 2b may simply be controlled to perform a small angular displacement of one of the first and second clutch portions for accomplishing the desired new relative angular position.

To conclude, the steps of the direct comparison algorithm are:
  a) To initialize a set of optional numbers as initial phase shift, i.e. a set of initial phase options;
  b) To register a clutch actuator feedback signal during a real clutch engagement attempt, while recording the angular displacement of the first and second clutch portions at time of clutch engagement attempt, c) To calculate/estimate the clutch actuator control signal for each optional remaining initial phase shift option from the set of initial phase shifts options, based on the obtained angular displacement of the first and second clutch portions;

d) To compare the estimated clutch actuator control signal with the actual clutch actuator signal, i.e. the registered clutch actuator feedback signal;

e) To remove the initial phase shift options, from the set of initial phase shifts options, which result in an estimated clutch actuator control signal that differs from, or does not match with, the registered clutch actuator feedback signal, specifically differs more than a threshold value, and to keep the initial phase shift options resulting in the estimated clutch actuator control signal being identical with, or substantially the same as, the registered clutch actuator feedback signal; and f) If there is only one initial phase shift option remaining that results in estimated clutch control signal being identical with, or substantially the same as the actual clutch actuator signal, the iteration is interrupted and the solution is obtained; If not, steps b-f are repeated at the next time moment, i.e. at a new relative angular position between the first and second clutch portions.

Figure 7B:
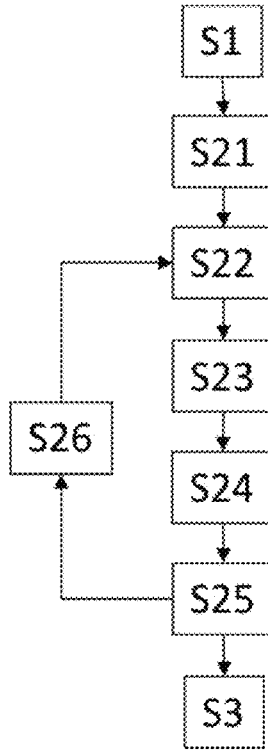
FIG. 7B shows schematically some basic steps of the direct comparison search algorithm.

In other words, with reference to FIG. 7B, the second step S2 of the previously described method for operating the drivetrain, involving controlling the clutch actuator 13, 34 and the first electrical propulsion motor 2a, 2b for performing a plurality of clutch engagement movements for a set of different relative angles between the first and second clutch portions, while registering for each individual clutch engagement movement the clutch actuator feedback signal, and identifying the initial phase shift between the first and second clutch portions that corresponds to successful mutual intermeshing engagement of the first and second sets of teeth, may include the following sub steps: a first sub step S21 of selecting a set of initial phase options, a second sub step S22 of controlling the clutch actuator 13, 34 for performing a dog clutch engagement attempt while registering the clutch actuator feedback signal and current angular position data of first and second clutch portions, a third step S23 of calculating an estimated clutch actuator control signal for each individual initial phase option from the selected set of initial phase options for the obtained current angular position data of first and second clutch portions, a fourth sub step S24 of comparing the estimated clutch actuator control signal for each individual initial phase option with the registered clutch actuator feedback signal for detecting a matching signal characteristic, and a fifth sub step S25 of removing any individual initial phase options, from the selected set of set of initial phase options, that do not result in a matching signal characteristic, and when only one individual initial phase option remain, the initial phase shift has been identified. Otherwise, i.e. when more than one individual initial phase option still remain, the method proceeds to a sixth step S26 of controlling the first electrical propulsion motor for setting the first and second clutch portions in a new relative angular position that is offset from the previous relative angular position, and repeating said steps S22-S25.

Figures 8A, 8B:
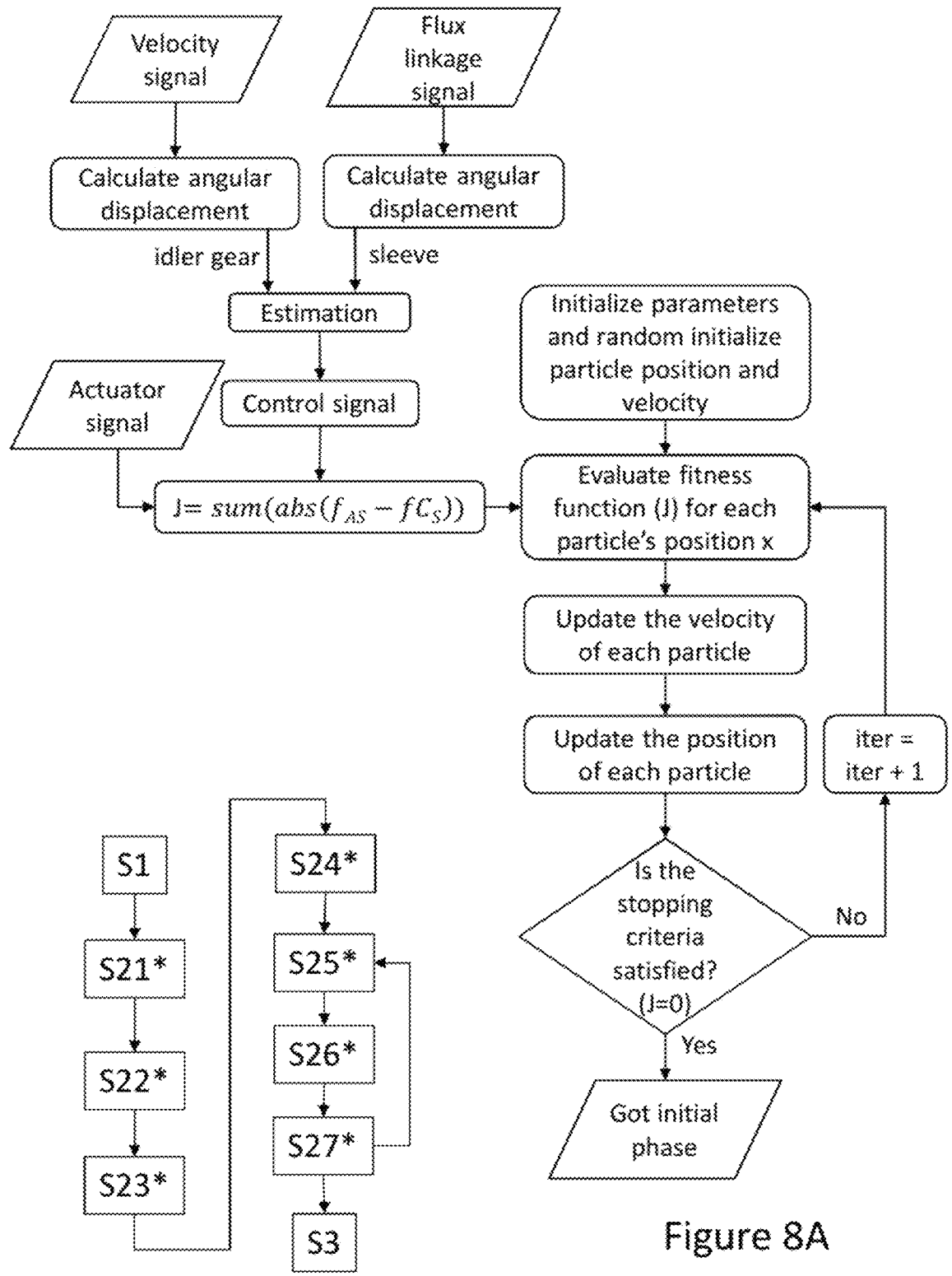
FIG. 8A shows schematically a flow chart illustrating some relevant aspects of the particle swarm optimization search algorithm.
FIG. 8B shows schematically some basic steps of the particle swarm optimization search algorithm.

A second method for identifying the initial phase shift angle involves applying particle swarm optimization to approximate the results. In this In this algorithm, of which the flowchart is shown in FIG. 8A, the actuator feedback signal may be simplified into the following function:

$$f_{AS}(t) = \begin{cases} 1, & \text{when it is safe for shifting} \\ 0, & \text{there is crash during shifting} \end{cases} \quad (26)$$

In the application of particle swarm optimization, the fitness function may be defined as:

$$J = \int |f_{AS} - f_{CS}| dt = \sum_t |AS_i - CS_i| \quad (27)$$

Actual clutch actuator signal and estimated clutch actuator signal are utilized in array form for certain testing time. In each iteration, the velocity and the position of each particle are updated and the fitness function is evaluated. Here are the procedures in detail:

a) To initialize particle parameters and particle swarm optimization parameters;

b) To evaluate the objective function of the initial particles;

c) To update the velocity and the position of each particle and to evaluate the objective function of them;

d) If J=0 is satisfied, the iteration is interrupted and the solution is obtained; if not, repeat steps c and d.

In other words, with reference to FIG. 8B, the second step S2 of the method previously described method that involves controlling the clutch actuator 13, 34 and the first electrical propulsion motor 2a, 2b for performing a plurality of clutch engagement movements for a set of different relative angles between the first and second clutch portions, while registering for each individual clutch engagement movement the clutch actuator feedback signal, and identifying the initial phase shift between the first and second clutch portions that corresponds to successful mutual intermeshing engagement of the first and second sets of teeth, may be performed by use of a particle swarm optimization (PSO) algorithm involving the following sub steps: a first sub step S21* of performing a plurality of dog clutch engagement attempts, each at a different relative angular position of the first and second clutch portions, while registering, for each dog clutch engagement attempt, the clutch actuator feedback signal and current angular position data of first and second clutch portions. The PSO algorithm further includes a second sub step S22* of calculating an estimated clutch actuator control signal for each of the plurality of plurality of dog clutch engagement attempts. The PSO algorithm further includes a third sub step S23* of providing a fitness function $J=\int|f_{AS}-f_{CS}|dt$ having as variables: $f_{AS}(t)$=the registered clutch actuator feedback signal and $f_{CS}(t)$=the estimated clutch actuator control signal. The PSO algorithm additionally includes a fourth sub step S24* of initializing random particle position and velocity. Finally, The PSO algorithm further includes a fifth sub step S25* of evaluating the fitness function for each particle's position, a sixth sub step S26* of updating the velocity and the position of each particle, and a seventh sub step S27* of checking whether J=0 is satisfied, and if yes the initial phase shift has been identified, otherwise iterating the sub steps S25*-S27* of evaluating the fitness function for each particle's position, updating the velocity and the position of each particle, and checking whether J=0 is satisfied.

Figure 9:
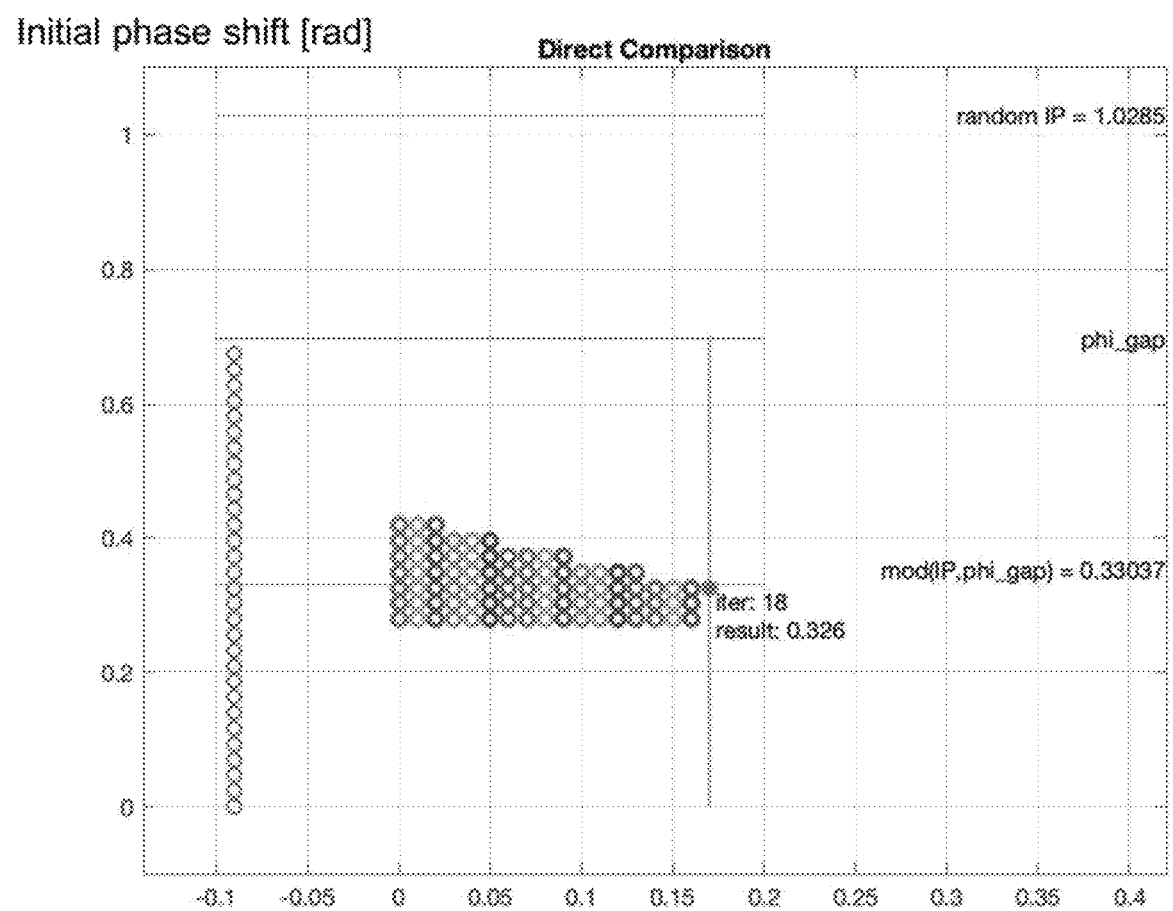
FIG. 9 shows operation and result of a simulation of the direct comparison search algorithm.

A simulation of each of the two described phase shift angle identification algorithms has been performed and FIG. 9 schematically shows the result when running the direct comparison algorithm with 30 initial phase shift options (elements) in the set, which initial phase shift (IP) elements are selected according to: 0: phi_gap/30: phi_gap. In this example simulation, it takes 18 times of iteration in the simulation to find out the solution. Phi_gap is about 0.7 rad, the random input is 1.0285 rad and the solution is 0.326 rad.

Figure 10:
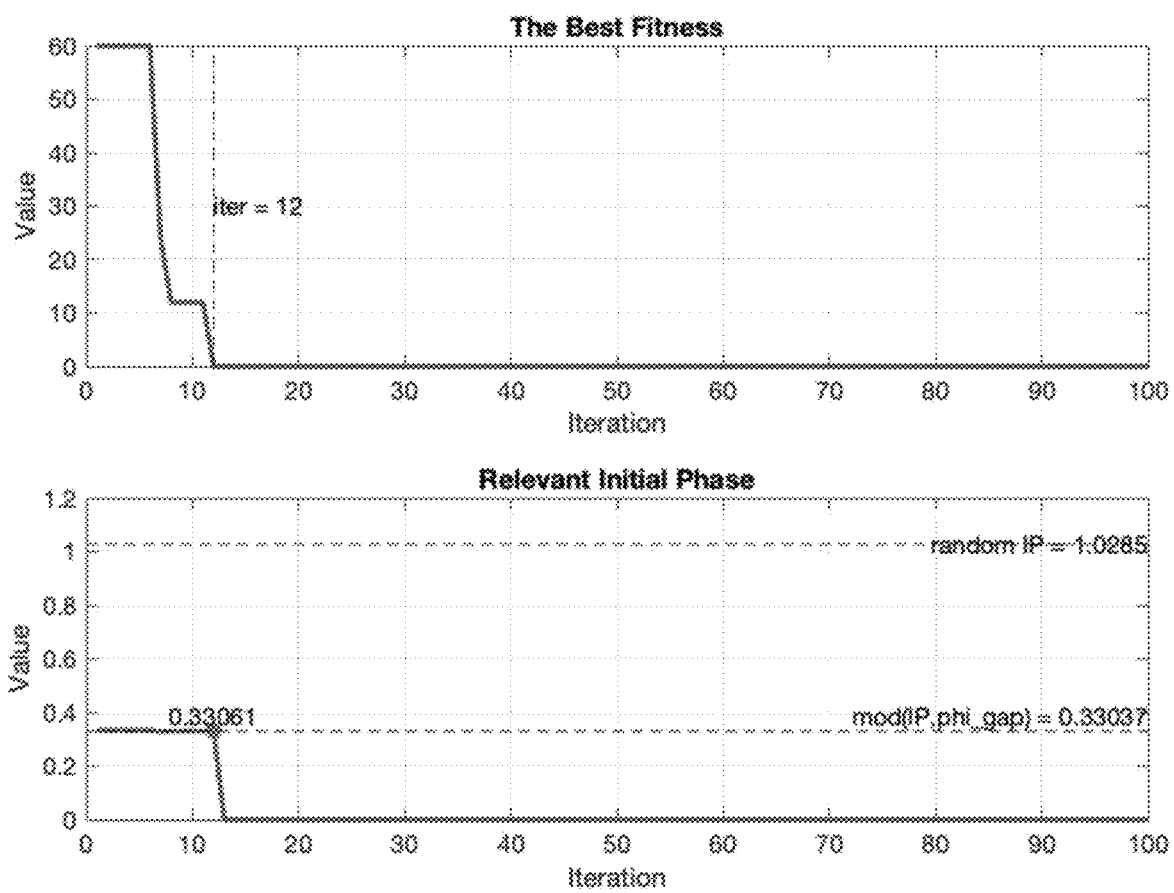
FIG. 10 shows operation and result of a simulation of the particle swarm optimization search algorithm.

FIG. 10 schematically shows a simulation result when running the particle swarm optimization algorithm. In the particle swarm optimization illustrated here, there is only one particle which is initial phase. Swarm size is selected to 30, initial weight is selected to 0.6 and maximum iteration number is 100. The random input is 1.0285 again and it takes 12 times of iteration in this computation and the solution is 0.331 rad, which approximate to mod(1.0285, $\phi_{gap}$)≈0.330.

Those skilled in the art will appreciate that the steps and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

According to an exemplary embodiment, there is provided a non-transitory computer-readable storage medium storing one or more programs configured to be executed by one or more processors of the electronic control system of the drivetrain, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors arranged on the vehicle surface, an off-site server, or a cloud-based server.

The processor(s) of the electronic control system of the drivetrain may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Although discussed above as methods described by the flowchart of FIGS. 7A-7B and 8A-8B, it should be appreciated that the operations may be performed in any order and do not necessarily imply an order as provided. Rather, the methods discussed are merely one embodiment of the present disclosure as contemplated.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

| Symbol | Description |
|---|---|
| $T_L$ | Engagement torque (Nm) |
| $T_{sym}$ | Torque applied to the idler gear (Nm) |
| $T_e$ | Torque from permanent-magnet synchronous motor (Nm) |
| $T_{tire}$ | Torque applied to the tires (Nm) |
| $\Delta\varphi$ | Relative initial phase between shift sleeve and idler gear (rad) |
| $\phi_{sl}$ | Angular displacement of shift sleeve (rad) |
| $\phi_{ig}$ | Angular displacement of idler gear (rad) |
| $\phi_{sl,c}$ | Critical angle of shift sleeve (rad) |
| $\phi_{ig,c}$ | Critical angle of idler gear (rad) |
| $\phi_{is}$ | Angular displacement of input shaft (rad) |
| $\phi_{os}$ | Angular displacement of output shaft (rad) |
| $\phi_{ig}$ | Angular displacement of idler gear (rad) |
| $n_{dog}$ | Number of dog teeth (m) |
| $w_{dog}$ | Width of one dog tooth (m) |
| $\phi_{dog}$ | Corresponding angle of one dog tooth (rad) |
| c | Clearance between dog teeth (m) |
| $\phi_c$ | Corresponding angle of clearance between dog teeth (rad) |
| $y_{gap}$ | Tangential distance of a model unit (m) |
| $\phi_{gap}$ | Corresponding angle of a model unit (rad) |
| $k_{is}$ | Stiffness of input shaft (N/m) |
| $k_{os}$ | Stiffness of output shaft (N/m) |
| $d_{is}$ | Damping rate of input shaft (N · s/m) |
| $k_a$ | Stiffness of actuator (N/m) |
| $d_a$ | Damping rate of actuator (N · s/m) |
| $k_c$ | Stiffness of clutch engagement (N/m) |
| $d_c$ | Damping rate of clutch engagement (N · s/m) |
| $d_{os}$ | Damping rate of output shaft (N · s/m) |
| $J_{ig}$ | Inertia of idler gear (kg · m^2) |
| $J_{os}$ | Inertia of output shaft (kg · m^2) |
| $J_{sl}$ | Inertia of shift sleeve (kg · m^2) |
| $J_{is}$ | Inertia of input shaft (kg · m^2) |
| $J_{og}$ | Inertia of output gear engaged with idler gear (kg · m^2) |
| $r_{sl}$ | Radius of sleeve pitch circle (m) |
| $\omega_{sl}$ | Angular velocity of shift sleeve (rad/s) |
| $\omega_{ig}$ | Angular velocity of idler gear (rad/s) |
| $\omega_{is}$ | Angular velocity of input shaft (rad/s) |
| $\omega_{os}$ | Angular velocity of output shaft (rad/s) |
| $x_{oa}$ | Axial displacement from actuator output (m) |
| $x_{sl}$ | Axial displacement of shift sleeve (m) |
| $x_{rele}$ | Relevant axial displacement between shift sleeve and idler gear (m) |
| $x_{a,ref}$ | Reference axial displacement of actuator (m) |
| $r_m$ | Resistance of mechanical part in actuator motor (Ω) |
| $k_{emf}$ | Coefficient of counter-electromotive force (V · s/m) |
| $L_m$ | Inductance of mechanical part in actuator motor (H) |
| $k_m$ | Coefficient of motor output force (N/A) |
| $m_{sl}$ | Mass of shift sleeve (kg) |
| $F_f$ | Actuator friction force (N) |
| $F_a$ | Actuator force (N) |

-continued

| Symbol | Description |
| --- | --- |
| $i_a$ | Actuator current (A) |
| $u_c$ | Controlled voltage to the actuator (V) |
| $u$ | Driving voltage from the actuator (V) |
| $y_{sl}$ | Tangential displacement of shift sleeve (m) |
| $y_{rele}$ | Relevant tangential displacement between shift sleeve and idler gear (m) |
| $k_{cp}$ | Coefficients for the proportional term in actuator PD controller (V/m) |
| $k_{cd}$ | Coefficients for the derivative term in actuator PD controller (V · s/m) |
| $\gamma_t$ | Shift sleeve displacement angle (rad) |

What is claimed is:

1. A method for operating a vehicle drivetrain including a dog clutch and having at least two distinct operating modes: an initial phase shift identifying mode and a normal operating mode, the method comprising the steps of providing:
the dog clutch for selective torque transmission, wherein the dog clutch has a first clutch portion with a first set of teeth and a second clutch portion with a second set of teeth, and wherein the first clutch portion is axially moveable for enabling shifting of the dog clutch between an engaged state, in which the first and second clutch portions are operable to transmit torque between first and second clutch portion via the first and second set of teeth, and a disengaged state, in which the first and second clutch portions are rotatable with respect to each;
a first electrical propulsion motor drivingly connected with one of the first and second clutch portions;
clutch actuator operably connected with the first clutch portion for shifting the dog clutch between the engaged and disengaged states by controlling an axial position of the first clutch portion;
setting the drive train in the initial phase shift identifying mode, which includes:
controlling the clutch actuator and the first electrical propulsion motor for performing a plurality of clutch engagement movements for a set of different relative angles between the first and second clutch portions, while registering for each individual clutch engagement movement a clutch actuator feedback signal associated with the clutch actuator and indicative of either successful mutual intermeshing engagement of the first and second sets of teeth, or teeth collision of the first and second sets of teeth; and
identifying, based on the registered clutch actuator feedback signal, the initial phase shift between the first and second clutch portions that corresponds to successful mutual intermeshing engagement of the first and second sets of teeth;
setting the drivetrain in the normal operating mode, which includes: obtaining angular position data associated with the first and second clutch portions; controlling engagement of the dog clutch while taking the obtained angular position data of first and second clutch portions and said identified initial phase shift into account for enabling interference-free engagement of the of the dog clutch.

2. The method according to claim 1, wherein the step of setting the drivetrain in the initial phase shift identifying mode is performed in connection with manufacturing of the vehicle, and/or in connection with vehicle maintenance.

3. The method according to claim 1, wherein the steps of controlling the clutch actuator and the first electrical propulsion motor for performing the plurality of clutch engagement movements for the set of different relative angles between the first and second clutch portions, while registering for each individual clutch engagement movement the clutch actuator feedback signal, and identifying the initial phase shift between the first and second clutch portions, are initiated manually or automatically by a remote service-provider or automatically by a vehicle internal control system and is performed with or without a driver or passenger within the vehicle.

4. The method according to claim 1, comprising selecting the set of different relative angles between the first and second clutch portions to include at least 5 individual relative angles.

5. The method according to claim 1, wherein the different relative angles within the set of different relative angles are evenly distributed.

6. The method according to claim 1, comprising selecting end points of the set of different relative angles between the first and second clutch portions sufficiently wide for ensuring including at least one clutch engagement position.

7. The method according to claim 1, wherein said steps of controlling the clutch actuator and the first electrical propulsion motor for performing the plurality of clutch engagement movements for the set of different relative angles between the first and second clutch portions, while registering for each individual clutch engagement movement the clutch actuator feedback signal, and identifying the initial phase shift between the first and second clutch portions that corresponds to successful mutual intermeshing engagement of the first and second sets of teeth, are part of applying a search algorithm for identifying said initial phase shift.

8. The method according to claim 7, wherein the search algorithm is a direct comparison search algorithm, a particle swarm optimization search algorithm, a binary search algorithm, or an artificial neural network.

9. The method according to claim 1, wherein said steps of controlling the clutch actuator and the first electrical propulsion motor for performing the plurality of clutch engagement movements for the set of different relative angles between the first and second clutch portions, while registering for each individual clutch engagement movement the clutch actuator feedback signal, and identifying the initial phase shift between the first and second clutch portions that corresponds to successful mutual intermeshing engagement of the first and second sets of teeth, involves:
selecting a set of initial phase options;
controlling the clutch actuator for performing a dog clutch engagement attempt while registering the clutch actuator feedback signal and current angular position data of first and second clutch portions;
calculating an estimated clutch actuator control signal for each individual initial phase option from the selected set of initial phase options for the obtained current angular position data of first and second clutch portions;
comparing the estimated clutch actuator control signal for each individual initial phase option with the registered clutch actuator feedback signal for detecting a matching signal characteristic;
removing any individual initial phase options, from the selected set of set of initial phase options, that do not result in a matching signal characteristic;
when only one individual initial phase option remain, the initial phase shift has been identified, otherwise, controlling the first electrical propulsion motor for setting the first and second clutch portions in a new relative angular position that is offset from the previous relative angular position, and repeating said steps of controlling the clutch actuator for performing a dog clutch engagement attempt while registering the clutch actuator feedback signal and current angular position data of first and second clutch portions, calculating the estimated clutch actuator control signal for each remaining individual initial phase option for the obtained current relative angular position, comparing the estimated clutch actuator control signal for each remaining individual initial phase option with the registered clutch actuator feedback signal for detecting a matching signal characteristic, and removing any individual initial phase options, from the selected set of set of initial phase options, that do not result in a matching signal characteristic.

10. The method according to claim 1, wherein said steps of controlling the clutch actuator and the first electrical propulsion motor for performing the plurality of clutch engagement movements for the set of different relative angles between the first and second clutch portions, while registering for each individual clutch engagement movement the clutch actuator feedback signal, and identifying the initial phase shift between the first and second clutch portions that corresponds to successful mutual intermeshing engagement of the first and second sets of teeth, are art of a particle swarm optimization searching algorithm involving:
  performing a plurality of dog clutch engagement attempts, each at a different relative angular position of the first and second clutch portions, while registering, for each dog clutch engagement attempt, the clutch actuator feedback signal and current angular position data of first and second clutch portions;
  calculating an estimated clutch actuator control signal for each of the plurality of plurality of dog clutch engagement attempts;
  providing a fitness function $J=\int |f_{AS}-f_{CS}|dt$ having as variables: $f_{AS}(t)$=the registered clutch actuator feedback signal and $f_{CS}(t)$=the estimated clutch actuator control signal;
  initializing random particle position and velocity;
  evaluating the fitness function for each particle's position;
  updating the velocity and the position of each particle;
  checking whether $J=0$ is satisfied, and if yes the initial phase shift has been identified, otherwise iterating the steps of evaluating the fitness function for each particle's position, updating the velocity and the position of each particle, and checking whether $J=0$ is satisfied.

11. The method according to claim 1, wherein the clutch actuator feedback signal is any of, or a combination of: supply voltage over an electrical clutch actuator motor, supply current to the electrical clutch actuator motor, hydraulic pressure of a hydraulic actuator motor or piston, contact pressure applied by the clutch actuator on the first clutch portion, motion of a component associated with the clutch actuator or first clutch portion.

12. The method according to claim 1,
  wherein the first clutch portion of the dog clutch is a shift sleeve of a stepped gear transmission of the drivetrain, wherein the shift sleeve is rotationally fastened to, and axially displaceable with respect to, a transmission shaft, and the second clutch portion of the dog clutch is a first freewheeling gear arranged on, and rotatable relative to, said transmission shaft, or
  wherein each of the first and second clutch portions of the dog clutch has a circular disk-like shape with a set of teeth protruding in an axial direction of the dog clutch.

13. The method according to claim 12, wherein the shift sleeve is free from a mechanical synchroniser device.

14. The method according to claim 1, wherein the method comprising the steps of:
  providing the first electrical propulsion motor drivingly connected with the first clutch portion; and
  providing a second electrical propulsion motor drivingly connected with the second clutch portion.

15. A vehicle drive train comprising:
  a dog clutch for selective torque transmission, wherein the dog clutch has a first clutch portion with a first set of teeth and a second clutch portion with a second set of teeth, and wherein the first clutch portion is axially moveable for enabling shifting of the dog clutch between an engaged state, in which the first and second clutch portions are operable to transmit torque between first and second clutch portion via the first and second set of teeth, and a disengaged state, in which the first and second clutch portions are rotatable with respect to each;
  a first electrical propulsion motor drivingly connected with one of the first and second clutch portions;
  a clutch actuator operably connected with the first clutch portion for shifting the dog clutch between the engaged and disengaged states by controlling an axial position of the first clutch portion;
  an electronic control system configured for controlling the operation of the drivetrain in at least two distinct operating modes: an initial phase shift identifying mode and a normal operating mode, wherein the electronic control system is configured for:
  setting the drivetrain in the initial phase shift identifying mode, which includes the steps of: controlling the clutch actuator and the first electrical propulsion motor for performing a plurality of clutch engagement movements for a set of different relative angles between the first and second clutch portions, while registering for each individual clutch engagement movement a clutch actuator feedback signal associated with the clutch actuator and indicative of either successful mutual intermeshing engagement of the first and second sets of teeth, or teeth collision of the first and second sets of teeth, and identifying, based on the registered clutch actuator feedback signal, the initial phase shift between the first and second clutch portions that corresponds to successful mutual intermeshing engagement of the first and second sets of teeth; and
  setting the drivetrain in a normal operating mode, which includes the steps of: obtaining angular position data associated with the first and second clutch portions, controlling engagement of the dog clutch while taking the obtained angular position data of first and second clutch portions, and said identified initial phase shift into account for enabling interference-free engagement of the of the dog clutch.

16. A vehicle comprising the vehicle drive train according to claim 15.

* * * * *